United States Patent [19]
Gates

[11] 3,977,819
[45] Aug. 31, 1976

[54] APPARATUS FOR BENDING THERMOPLASTIC SHAPES

[76] Inventor: John I. Gates, 114 Via Mentone, Newport Beach, Calif. 92663

[22] Filed: May 21, 1974

[21] Appl. No.: 471,276

Related U.S. Application Data

[62] Division of Ser. No. 329,661, Feb. 5, 1973, abandoned, which is a division of Ser. No. 145,866, May 21, 1971, abandoned.

[52] U.S. Cl. ............................... 425/394; 72/153; 425/458
[51] Int. Cl.² ........................................ B29C 17/00
[58] Field of Search .......... 425/394, 318, 383, 384, 425/458, 393, 453; 72/149, 150, 151, 152, 153, 154, 155, 156, 157, 158, 159

[56] References Cited
UNITED STATES PATENTS

| | | | |
|---|---|---|---|
| 1,386,068 | 8/1921 | Maynard | 264/157 |
| 2,182,626 | 12/1939 | Fischer | 72/153 |
| 2,217,053 | 10/1940 | Henricson | 72/153 |
| 3,806,301 | 4/1975 | Osterhagen et al. | 425/DIG. 218 |

*Primary Examiner*—Francis S. Husar
*Assistant Examiner*—Robert J. Charvat
*Attorney, Agent, or Firm*—Christie, Parker & Hale

[57] ABSTRACT

Apparatus for bending rigid extruded thermoplastic resin shapes without significant deformation of the cross-sectional configuration of the shape is described.

The bending apparatus includes a rigid die member which has a convex die surface configured to mate intimately with a portion of the cross-sectional configuration of the shape to be bent prior to and during the bending process. The convex die surface defines the desired curve to which the shape is to be bent. A flexible die is configured to mate intimately with substantially the remainder of the cross-sectional configuration of the shape. Heating fluid passages are provided through both the rigid and flexible dies for application of a heating fluid, preferably saturated steam where the shape is made of rigid vinyl, directly to the shape for conditioning of the shape for bending. The bending apparatus also includes means for forceably mating and confining the shape between the rigid and flexible dies over the length of the convex die surface defining the desired curve of the final bend.

33 Claims, 24 Drawing Figures

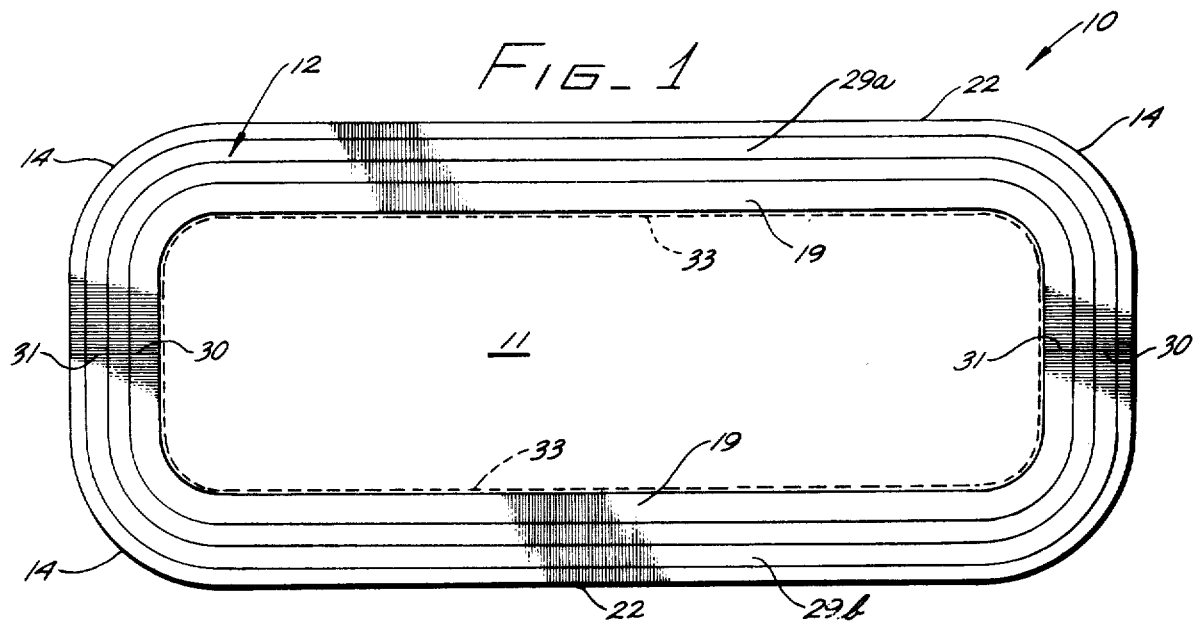
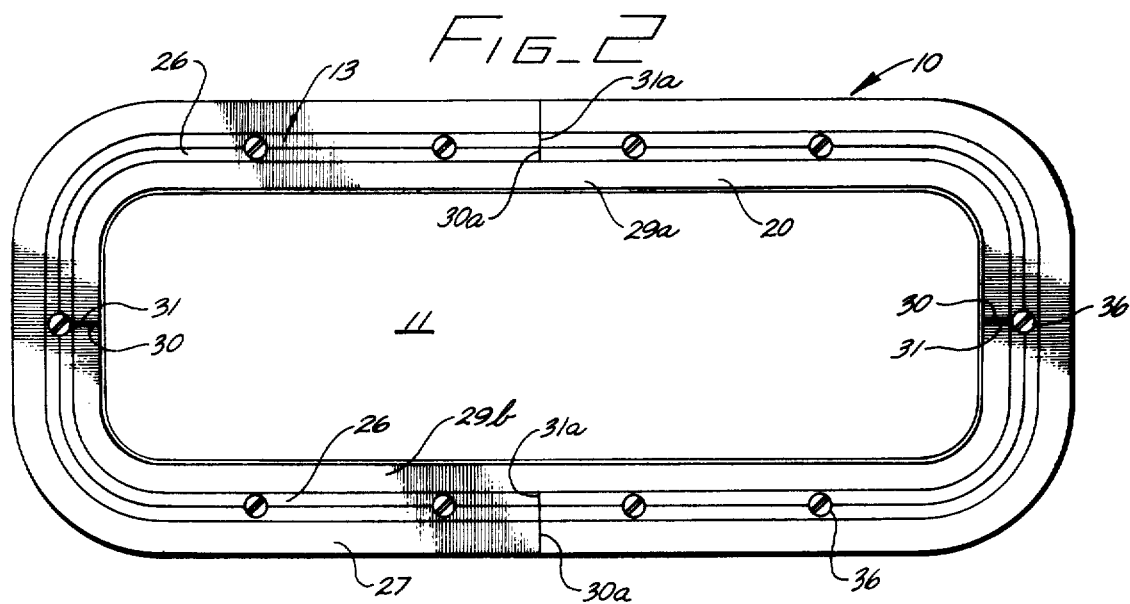

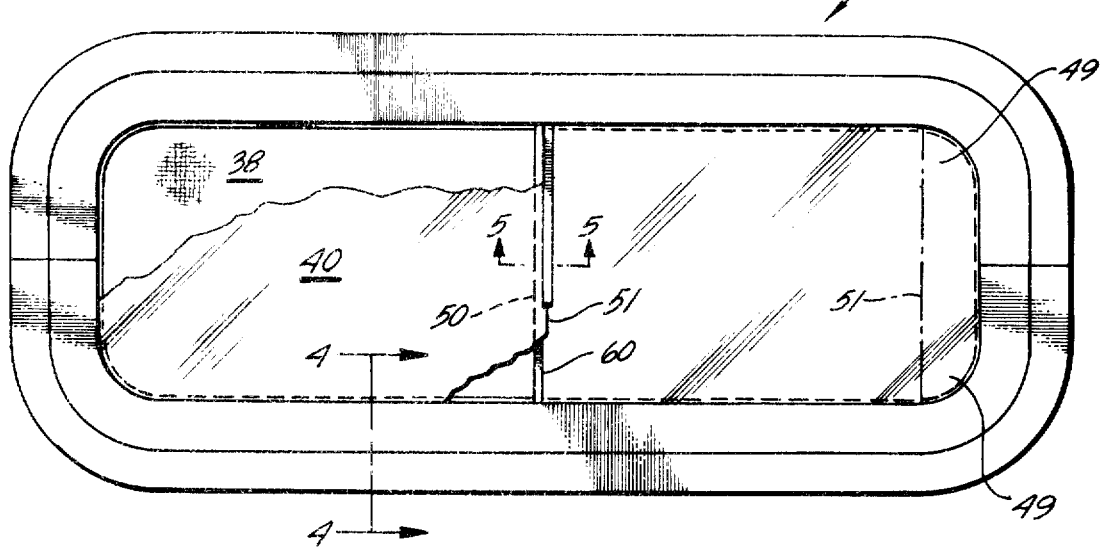
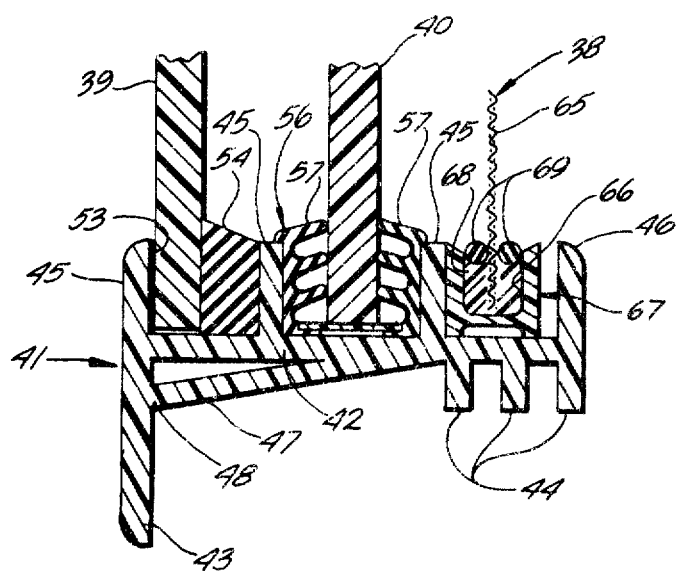
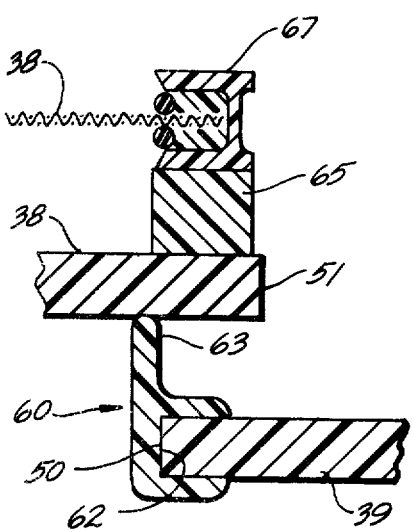

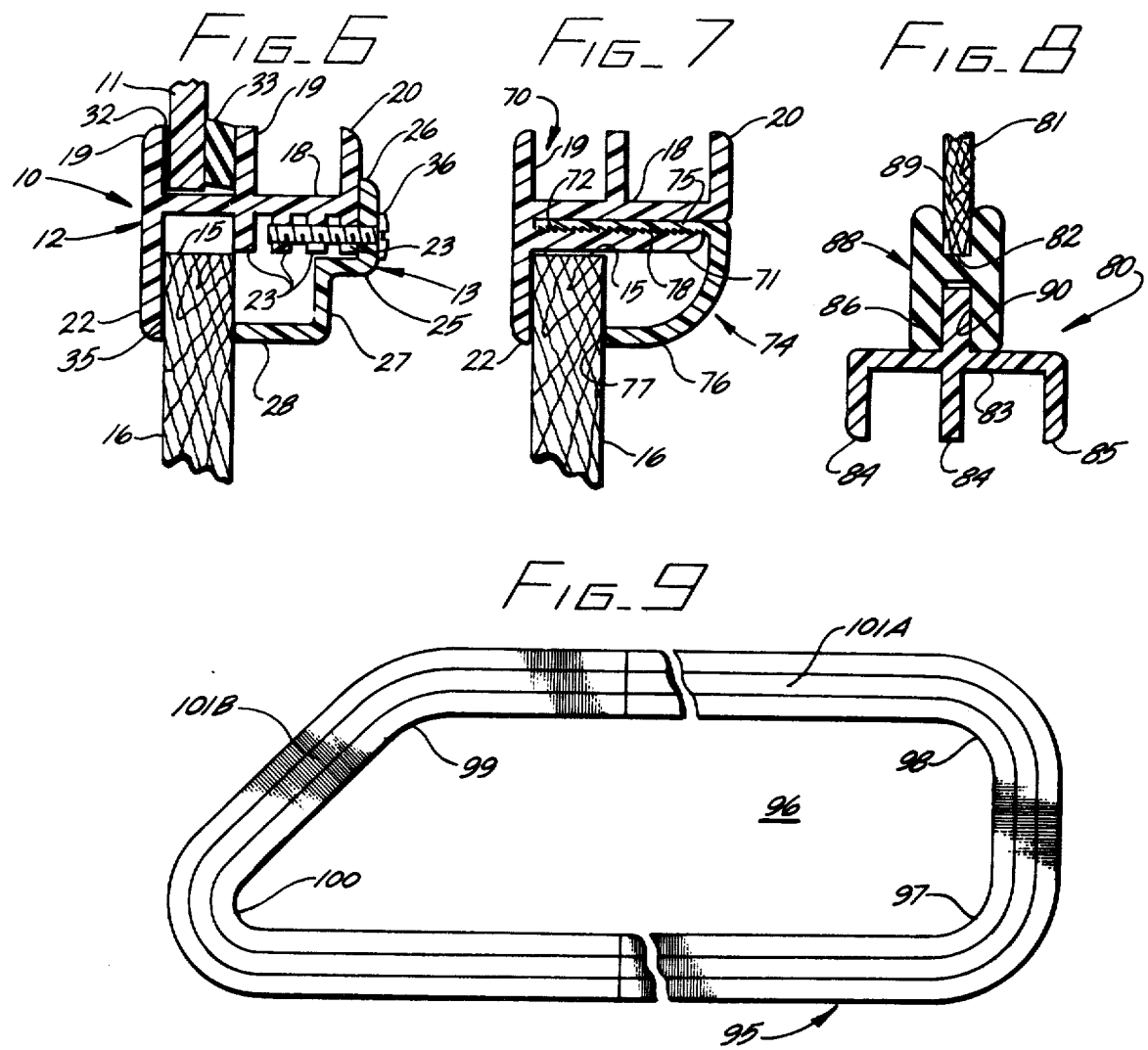

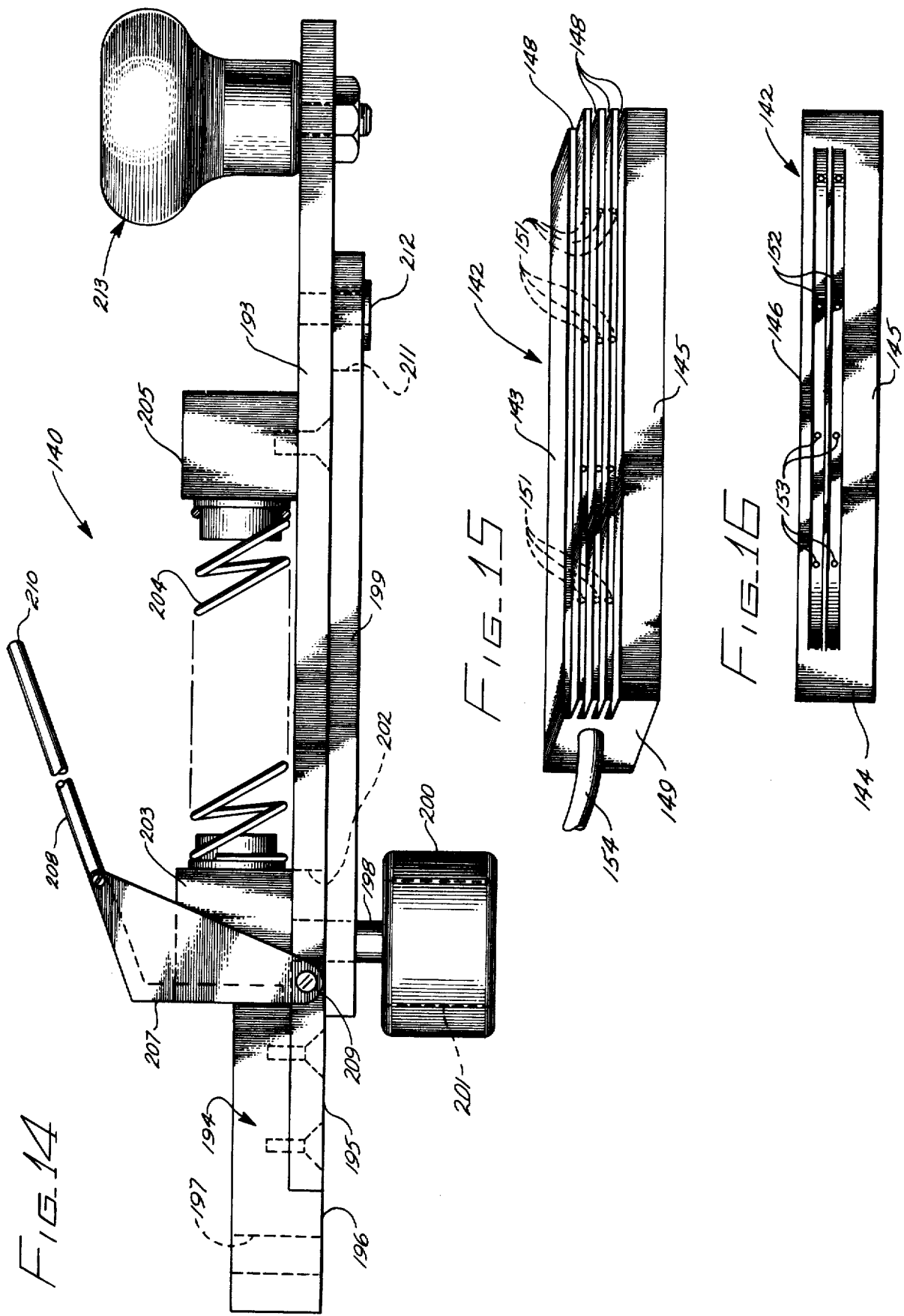

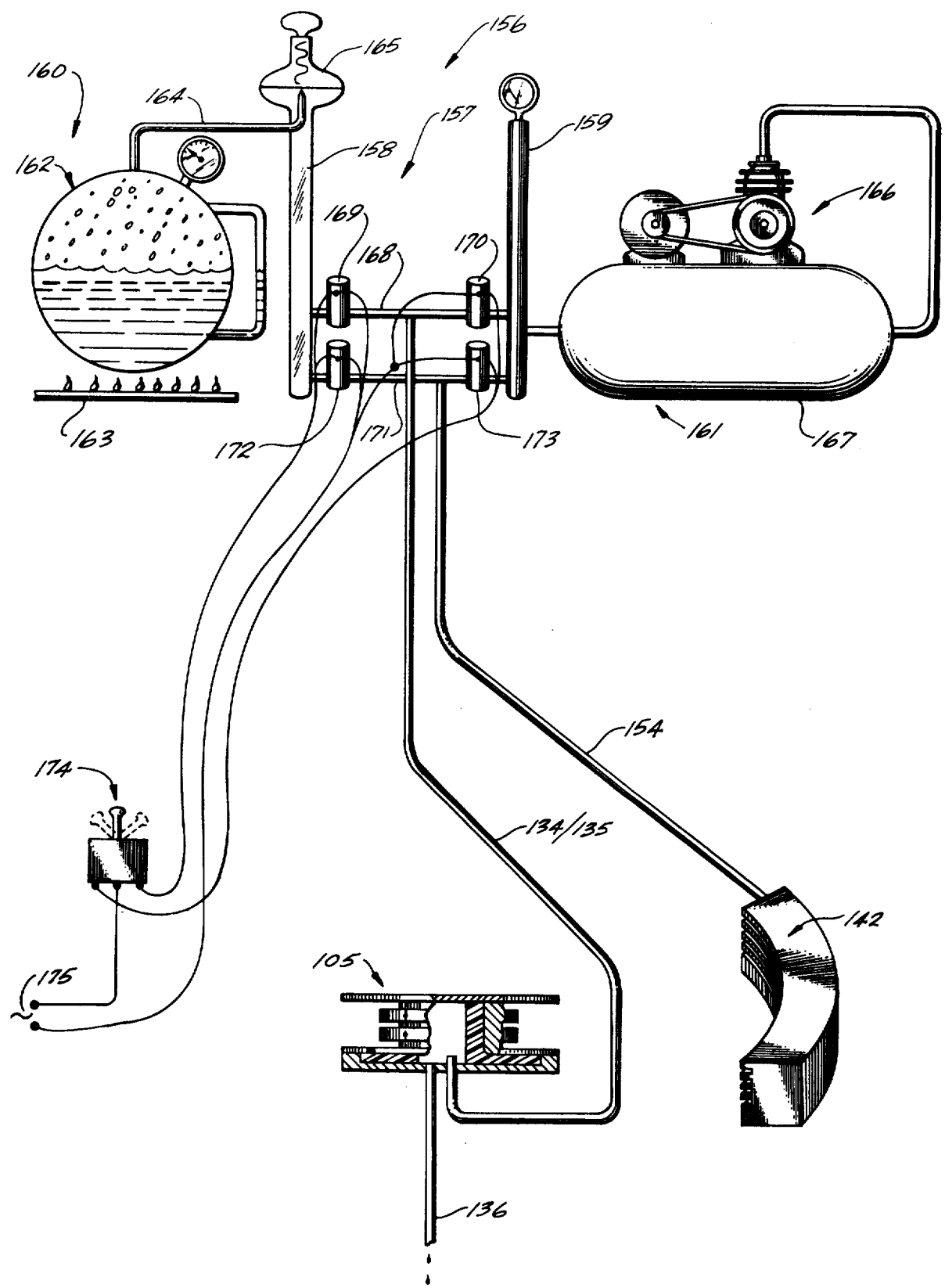

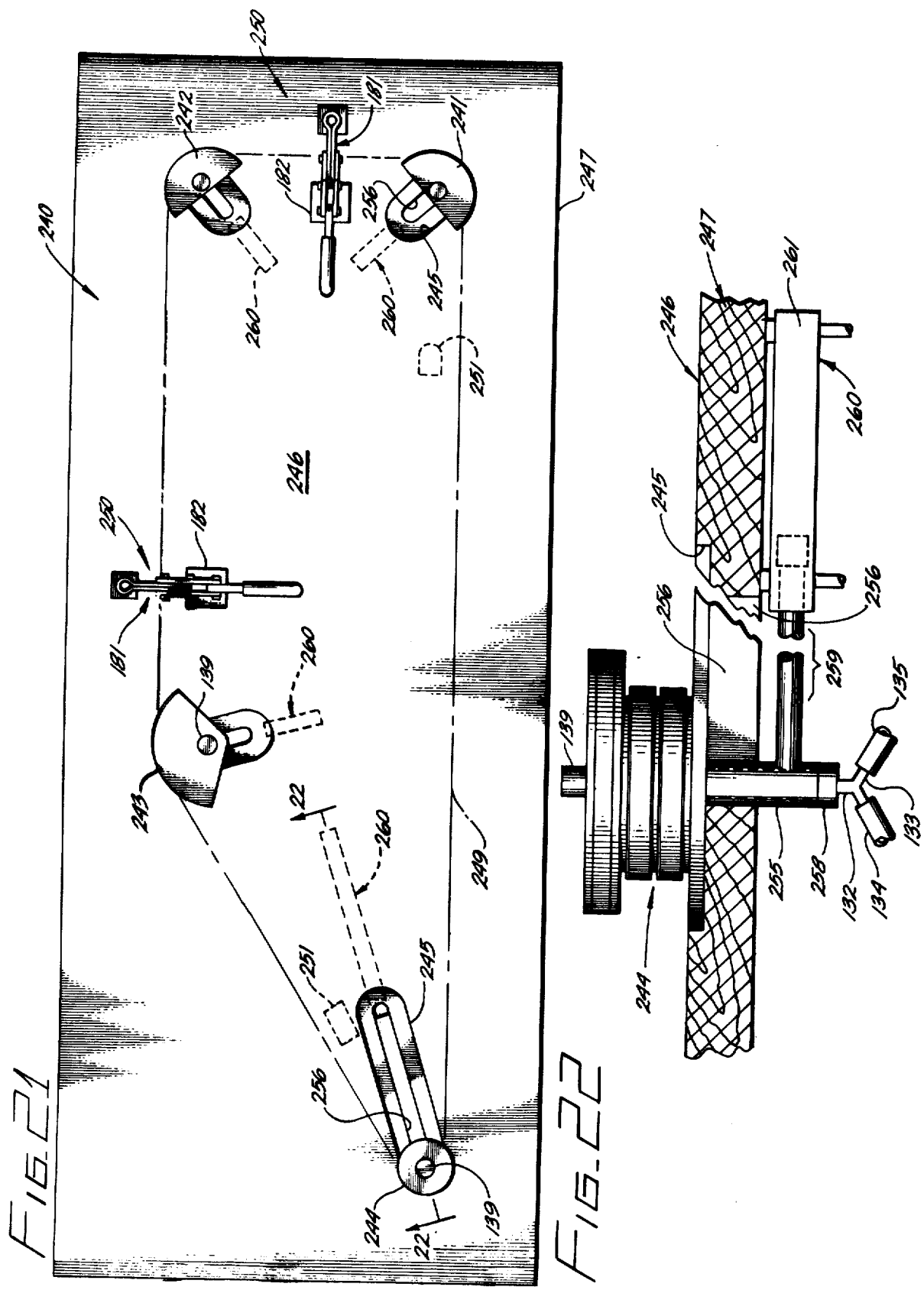

| SW. | (243) DIE #1 | (244) DIE #2 | (241) DIE #3 | (242) DIE #4 | (142) SHOE | (260) CYL. CONT. |
|---|---|---|---|---|---|---|
| 1 | — | — | — | — | — | ACTUATE |
| 2 | H.F. | — | — | — | H.F. | " |
| 3 | C | — | — | — | C | " |
| 4 | C | H.F. | — | — | H.F. | " |
| 5 | C | C | — | — | C | " |
| 6 | — | C | H.F. | — | H.F. | " |
| 7 | — | C | C | — | C | " |
| 8 | — | — | C | H.F. | H.F. | " |
| 9 | — | — | C | C | C | " |
| 10 | — | — | — | C | — | " |
| 11 | — | — | — | — | — | DEACTUATE |

3,977,819

APPARATUS FOR BENDING THERMOPLASTIC SHAPES

CROSS REFERENCE TO RELATED APPLICATIONS

This is a division of application Ser. No. 329,661 filed Feb. 5, 1973 (now abandoned) which was in turn a division of application Ser. No. 145,866 filed May 21, 1971 and now abandoned. U.S. Pat. No. 3,868,789 has issued on a continuation of application Ser. No. 145,866, and portions thereof are incorporated by reference herein.

FIELD OF THE INVENTION

This invention pertains to apparatus for bending an element of substantially rigid synthetic thermoplastic material having a web and at least one flange extending therefrom without significant distortion of the cross-sectional configuration of the element.

BACKGROUND OF THE INVENTION

Until very recently windows for use in sailboats, motorboats, yachts, camper trailers, house trailers and the like were fabricated of glass mounted in metal frames. For large boats, such as luxury yachts, the frames are made of brass, stainless steel or other corrosion resistant metal. These frame materials, however, are quite expensive and their use is not justified in the smaller windows required for sailboats, motorboats and camper trailers, for example. In smaller recreational vehicles, such as boats, camper trailers and the like, it is current practice to fabricate the window fames of bent extruded aluminum shapes. Aluminum, however, is susceptible to corrosion, especially in salt atmospheres such as are encountered in marine applications. Corrosion of aluminum window frames may be prevented by painting the frame, but this maintenance effort is not always pursued; also, paint does not adhere readily to aluminum, with the result that where a diligent painting program is pursued the window frames must be repainted frequently.

Recently, in an effort to overcome the disadvantages associated with aluminum frames, a window having a frame fabricated of thermoplastic material has recently been introduced commercially for use in small boats. This product has a pane of transparent synthetic resin and a one-piece frame fabricated of vacuum-formed ABS resin to which the pane is bonded. Because the frame is fabricated by vacuum forming techniques, the thickness of the frame material is necessarily relatively thin. Accordingly, these windows flex readily and the bond between the pane and the frame may break in response to such flexing. These windows have the advantage that they are made entirely of synthetic materials which are resistant to corrosion and which can be colored to harmonize with the remaining structure in which they are installed. These windows, because of their one-piece frame construction, are either bonded or screwed to the basic boat structure peripherally of the window opening. Where provided, an interior trim frame is merely bonded or screwed to the interior of the boat structure for the purposes of ornamentation. The trim frames have no structural cooperation with the support frame for the pane, and are not relied upon to mount the window in the window opening.

Because the pane supporting frames of the aforementioned all-synthetic windows are formed by vacuum forming techniques, the cross-sectional configuration of the frame necessarily must be simple. The complex cross-sectional shapes achievable in extrusions cannot be formed by vacuum forming techniques. Accordingly, existing all-synthetic resin windows are not openable in that the transparent pane of these windows is bonded to the supporting frame entirely around the periphery of the pane. An advantage of the more expensive windows having stamped or extruded frames is that such windows can have a fixed pane, a second movable openable pane and, if desired, a screen; these features are not possible where the frame is fabricated by vacuum forming or similar techniques.

It is known that attempts have been made to provide a window for camper trailers, boats and the like wherein the window frame is defined by an extruded rigid synthetic resin. These attempts sought to realize the increased advantages of a window having an extruded frame; these advantages include the ability to provide openable windows with or without screens and the increased structural strength obtainable with an extruded frame, thereby providing a window frame which does not flex and separate from the pane. These prior attempts were not successful, and it is believed that these failures were caused by the difficulties attendant to bending the normally straight extrusion into the appropriate curvature necessary for these types of windows. Aluminum is readily extrudable into myriad shapes of complex cross-sectional configuration, and these extrusions are bendable from a straight into a curved shape by techniques similar to the techniques used inpipe bending, for example. These techniques are dependent upon the cold-flowability of aluminum under extreme loads. Synthetic resins having the desired characteristics of rigidity and strength, however, do not possess these cold-flowable characteristics, with the result that techniques found successful for the bending of aluminum extrusions cannot be adapted to the bending of extrusions fabricated of synthetic materials such as rigid thermoplastic resins.

It is apparent from the foregoing, therefore, that a need exists for the provision of windows for boats, camper trailers and the like, in which the window frame is fabricated of an extruded synthetic material. Similarly, in order that these producets may be produced, a need exists for the developement of processes and equipment for the bending of rigid thermoplastic shapes without fracture of the thermoplastic material and without loss of the cross-sectional configuration defined by the shape.

SUMMARY OF THE INVENTION

In response to the need identified above, this invention provides apparatus and equipment for bending rigid thermoplasitc shapes without fracture of the thermoplastic material and without loss of the cross-sectional configuration defined by the shape. This invention provides apparatus which includes a rigid die member defining a die surface configured to intimately mate with a portion of the cross-sectional configuration of an element prior to and during bending of the element. The element is elongated and is fabricated of substantially rigid synthetic thermoplastic material having a web and aa flange extending from the web. The die surface preferably is convexly curved and is arranged to define the desired curve to which the element is to be bent. A flexible die is configured in cooperation with the rigid die to mate intimately with substantially the remainder of the cross-sectional configuration of the element when bent. Means are provided for heating the rigid die member and, via at least the rigid die member, an element mated with the rigid die sufficiently to soften the element to a plastic state. The bending apparatus further includes means for forceably mating and confining an element between the rigid and flexible dies over a length of the convex die surface of the rigid die which defined the desired curve.

It is preferred that the frame member provided in a window of this invention be fabricated of rigid vinyl material. It is also preferred that, during the bending process, the rigid vinyl extrusion be heated by applying saturated steam directly to the extrusion to cause the rigid vinyl to soften sufficiently to permit bending of the extrusion without tearing of the material during the bending process. Saturated steam has the advantage that its temperature corresponds almost exactly to the optimum temperature to which the rigid vinyl must be raised to permit bending to a curve without tearing of the extrusion. Also, the saturated steam can be provided without complex temperature control equipment, thereby resulting in a bending process and apparatus which are economical.

TERMINOLOGY

In the following description, the term shape is often used to refer to a rigid synthetic thermoplastic element which, in cross-section, is other than flat so as to have structural properties. The term shape is used in the same context as the word shape is used to describe rolled steel angles, channels, and I-beams for example, as opposed to flat bars.

DESCRIPTION OF THE DRAWINGS

The aforementioned and other features of this invention are more fully set forth in the following detailed description presented with reference to the presently preferred embodiments of the product, process and apparatus comprehended by the invention, which description is presented with reference to the accompanying drawings wherein:

FIG. 1 is an elevation view of the exterior side of a window according to this invention;

FIG. 2 is an elevation view of the interior side of the window shown in FIG. 1;

FIG. 3 is an elevation view of the exterior side of an openable multi-pane window according to this invention;

FIG. 4 is an enlarged cross-sectional elevation view taken along line 4—4 in FIG. 3;

FIG. 5 is an enlarged cross-sectional elevation view taken along line 5—5 in FIG. 3;

FIG. 6 is a cross-sectional elevation view of the frame members of another window according to this invention and shows one manner of mounting a window according to this invention in a window opening;

FIG. 7 is a cross-sectional elevation view similar to that of FIG. 6 showing another manner of mounting a window according to this invention in a window opening;

FIG. 8 is a cross-sectional elevation view through the frame member of still another window according to this invention and illustrates a third manner of mounting a window according to this invention in a window opening;

FIG. 9 is an elevation view of the exterior side of a frame member of another window according to this invention;

FIG. 14 is an elevation view of a bending handle useful with the bending dies shown in FIGS. 11 and 12;

FIG. 15 is a perspective view of a flexible bending die according to this invention;

FIG. 16 is a bottom plan view of the bending die shown in FIG. 15;

FIG. 20 is a partially schematic diagram of an extrusion bending apparatus according to this invention;

FIG. 21 is a top plan view of another extrusion bending apparatus according to this invention;

FIG. 22 is an enlarged elevation view taken along lines 22—22 in FIG. 21;

DESCRIPTION OF THE ILLUSTRATED EMBODIMENTS

Figure 10:
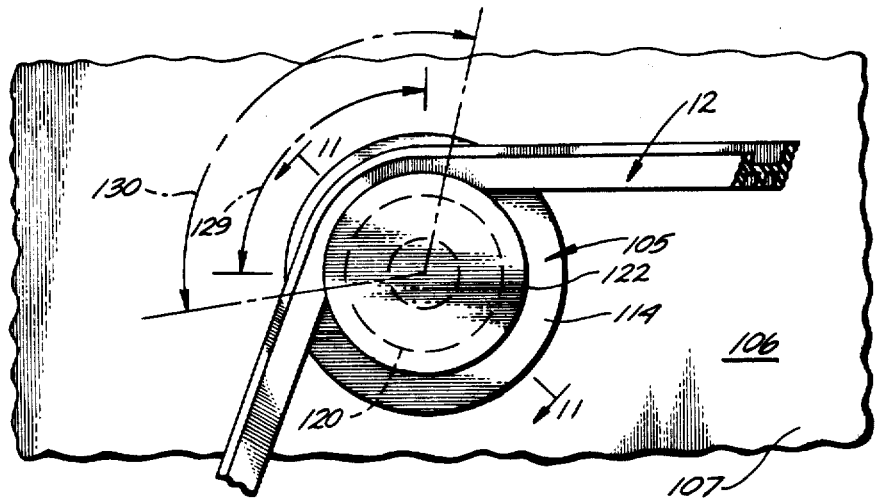
FIG. 10 is a top plan view of a rigid bending die according to this invention.

For the purposes of describing the windows shown in FIGS. 1–9, that portion of U.S. Pat. No. 3,868,789 issued Mar. 4, 1975 which begins at column 3, line 21, and which ends at column 15, line 9, is incorporated herein by reference as though fully set forth at this point.

FIGS. 10–23 illustrate various mechanisms, apparatus and systems useful in bending to the desired curvature extruded frame members of the type involved in windows 10, 21 and 95, for example. Because the window structures preferably incorporate frame members fabricated of bent rigid vinyl extrusions, the structures and procedures illustrated in FIGS. 10–24 have been developed to implement the manufacture of such windows and are described in furtherance of a full and complete explanation of this invention, one aspect of which is the provision of these windows. It will be understood, however, that the bending structures, systems and features described below may be used to advantage in bending elements of complex cross-sectional configuration fabricated of thermoplastic resin whether or not such elements originally are produced by extrusion processes and whether or not such elements are to be used in windows or in some other product. Accordingly, this invention, in terms of the methods and procedures described below, and in terms of the apparatus for implementing such methods and procedures, contemplates that the thermoplastic elements to be bent may be fabricated by casting techniques, for example, as well as by extrusion. For the purposes of example, the methods, procedures, structures and systems illustrated in FIGS. 10–24 are described with reference to the bending of an extruded rigid polyvinyl chloride member having a cross-sectional configuration corresponding to the cross-sectional configuration of exterior frame member 12 shown in detail in FIG. 6 and described with reference thereto; this fact should not be regarded as restricting the use of these procedures and structures to the manufacture of windows such as the windows described above.

Briefly summarized, an elongate member of complex cross-sectional configuration, i.e., a shape as defined above, fabricated of rigid thermoplasitc resin, is bent to a desired configuration while the cross-sectional configuration of the member is maintained over the arc of the bend. The shape is bent first by engaging a major portion of the cross-sectional configuration of the shape intimately with a bending die which is cooperatively configured to mate closely with the shape and to preserve the cross-sectional configuration thereof during the bending process. As mated with the bending die, the shape is heated, preferably by the application of a heating fluid directly to the shape via the bending die. The shape is heated to a temperature which is sufficiently elevated above ambient temperature that the thermoplastic material softens so as to lose a portion, but not all, of its rigid characteristics. That is, the shape, over the portion of the length thereof to be bent, is heated to a temperature which causes the thermoplastic material of the shape to soften and to lose a portion, but not all, of its tensile strength. Preferably, the temperature to which the shape is heated is a temperature which lies between the deflection temperature of the resin at 264 psi and the compression molding temperature for the resin. The bending die defines the curvature to which the shape is to be bent. Before the shape is actually bent to conform to the curvature of the bending die, a flexible second bending die is engaged with the remainder of the cross-sectional configuration of the shape. The flexible second die is then moved toward the first bending die, thereby to move the shape into intimate mating engagement with both dies over the length of the shape to be bent. The engagement of the shape between the bending dies is sufficiently forceful that the cross-sectional configuration of the shape is maintained during the bending process. Before the dies are separated from each other, the bent shape is cooled sufficiently to restore the sufficient tensile strength to the shape that the bent shape can be handled without distortion, and then the bent shape is removed from its engagement with the bending dies.

Figure 11:
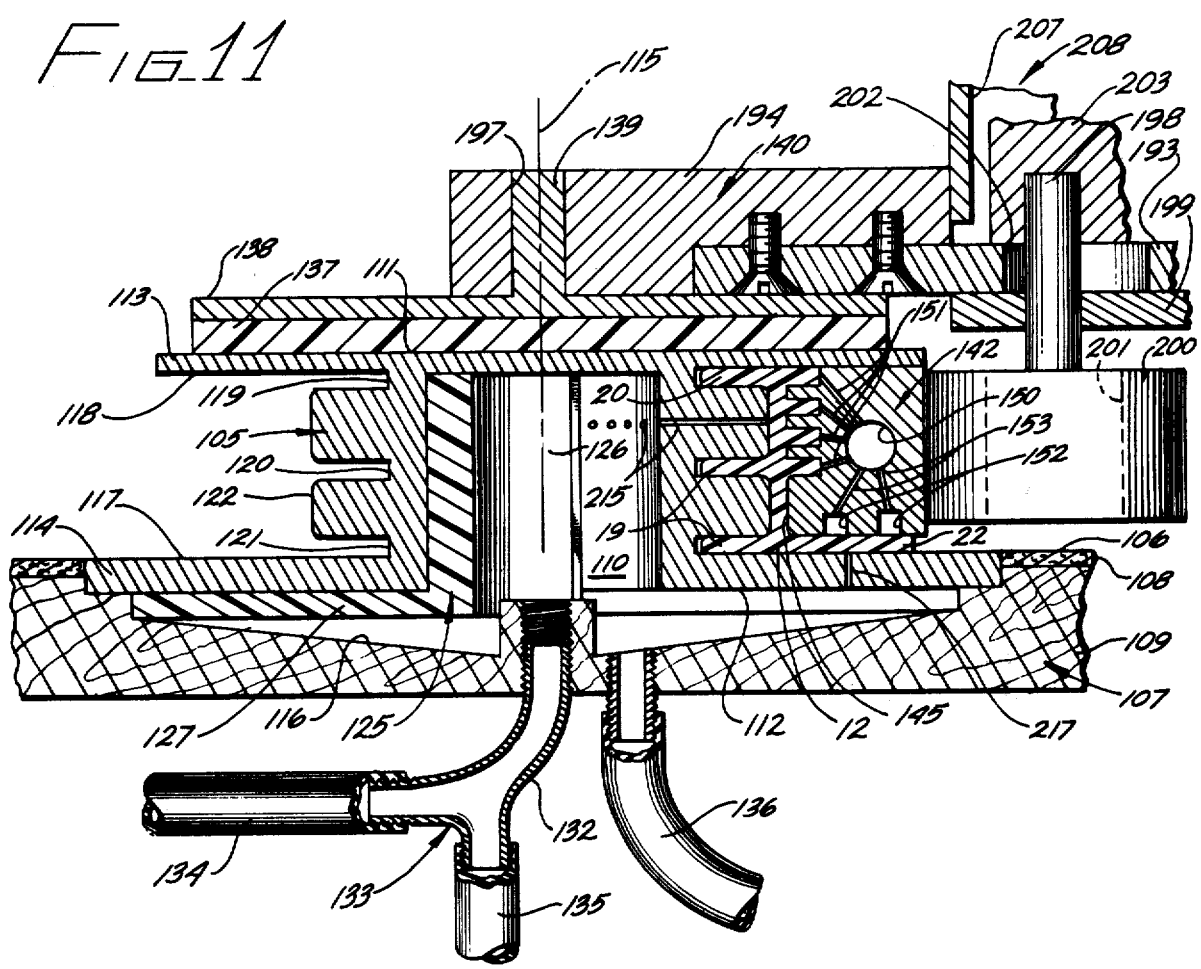
FIG. 11 is an enlarged cross-sectional elevation view of a rigid bending die.

As shown in FIGS. 10 and 11, a stationary rigid bending die 105 is mounted in the upper surface 106 of a support 107. Preferably, surface 106 is defined by a layer of laminated phenolic sheet material 108 (such as Formica-brand surfacing sheet material) bonded to a piece of wood 109 which is relied upon to define support 107. Laminated sheet material is preferred as the upper facing of support 107 because, in a presently preferred bending procedure, saturated steam is used as the heating fluid for the element to be bent and tends to condense on the upper surfaces of the support.

Bending die 105 preferably is provided in the form of a hollow, cylindrical metal drum having a center cavity 110, an upper end 111 and a lower end 112. Cavity 110 opens to die lower end 112, but not to die upper end 111. The exterior surface 122 of the die is formed to mate closely with a portion of the cross-sectional configuration of a thermoplastic member, such as exterior window frame member 12, to be bent. During the bending process, frame member 12 is intimately received with the exterior of the drum between an upper circumferential flange 113 and a lower circumferential flange 114 which extend parallel to each other radially of the axis 115 of the die. The die is mounted within a recess 116 formed in support 107 and so configured that the upper surface 117 of die lower flange 114 is coplanar with upper surface 106 of the support. The spacing between flange surface 117 and the lower surface 118 of upper flange 113 is only slightly greater than the width of frame member 12.

To facilitate intimate engagement of exterior frame member 12 with the circumference of die 105, three circumferential grooves are formed in die surface 122 between flanges 113 and 114. Accordingly, a first groove 119 is formed circumferentially of the die immediately adjacent surface 118 of upper flange 113 in such a manner that an extension of surface 118 forms one boundary of the groove. A second groove 120 is formed in the die surface 122 essentially midway between flanges 113 and 114, and a third groove 121 is formed immediately adjacent surface 117 of flange 114 in such manner that flange surface 117 forms one boundary of groove 121. As is readily apparent from FIG. 11, grooves 119, 120 and 121 are adapted to receive flanges 20, 19 and 19, respectively, of exterior frame member 12. Therefore, the grooves have a width (i.e., a dimension parallel to die axis 115) equal to the thickness of the corresponding flanges of the exterior frame member. Grooves 119, 120 and 121, however, have a depth, i.e., a dimension radially of the die inwardly from die convex surface 122 (the same being a right circularly cylindrical surface) which is a small selected amount greater than the extent of flanges 19 and 20 from web 18 of exterior frame member 12. Accordingly, as shown in FIG. 11, exterior frame member 12 is adapted to be intimately engaged with and mated to die 105 over a substantial portion of its cross-sectional configuration. As is apparent from the illustration in FIG. 11, die flanges 113 and 114, when the exterior frame member 12 is engaged to the die, extend radially outwardly beyond the adjacent portions of the exterior frame member. Die convex surface 122 has a radius of curvature which corresponds to the radius of curvature to which web 18 of exterior frame member 12 is to be bent so as to assume concave curvature.

Bending die 105 is defined of a metal which has high thermal conductivity. Aluminum has been found to be a suitable die material since it readily conducts heat and is readily machined to the desired configuration.

A thermally insulative liner 125 is disposed within cavity 110 of die 105 as shown in FIG. 11. The liner may be fabricated of heat resistant phenolic resin or the like, if desired. The liner has a cylindrical portion 126 which is engaged with the walls of cavity 110 from the upper end of the cavity to the lower end of the cavity around only a portion of the circumference of the cavity. The liner also has a radial flange 127 at its lower end which is engaged within recess 116 with the underside of die member flange 114. Liner flange 127 encompasses the same arc around die 105 as does the liner cylindrical portion.

Referring to FIG. 10, assume that exterior frame member 12 is to be bent through an arc 129 of 90° by use of bending die 105. The portion of the circumference of cavity 110 which is not covered by cylindrical portion 126 of liner 125 subtends an arc 130 which is greater than arc 129. The value of arc 130 may be on the order of 110°, for example. As shown in FIG. 10, arcs 129 and 130 are arranged so that arc 129 is centered within arc 130. The function of liner 125 is to insulate the portion of the die member which lies outside of arc 130 from the heating action of heating fluid introduced into cavity 110 via a heating and cooling fluid inlet duct 132, which communicates through support 107 to cavity 110. It is desired, primarily because of considerations of thermodynamic efficiency and the elimination of safety hazards to personnel using bending die 105, that only the portion of die 105 lying within arc 130 be heated during use of the bending die. It is apparent, therefore, that it is within the scope of this invention that only the portion of bending die 105 defined within arc 130 need be made of thermally conductive material such as metal, and that the remainder of the circumference of the bending die may be made of some insulative material such as wood or Bakelite phenolic resin, if desired.

Preferably, duct 132 is relied upon to conduct both a suitable heating fluid to cavity 110 and, at different intervals during the bending of exterior frame member 12, to conduct a suitable cooling medium to cavity 110. Accordingly, duct 132 preferably is one leg of a Y connection 133. A heating fluid supply conduit 134 and a cooling medium supply conduit 135 are connected to respective ones of the other legs of Y connection 133.

In a presently preferred bending system according to this invention, the heating fluid supplied to die member 105 is saturated steam, which condenses within cavity 110 and recess 116 of support 107. To facilitate drainage of condensed steam from recess 116, a drain tube 136 communicates through the bottom of support 107 to the lowermost extremities of recess 116.

A piece of rigid, thermally insulative material 137 is secured to the upper end of die member 105 and carries a bearing plate 138 from which a spindle 139 extends upwardly along axis 115 of die 105. Spindle 139 is provided to define the fulcrum point for a bending handle assembly 140, described in detail below. In use of the apparatus illustrated in FIG. 11, the bending handle assembly bears against and is supported by bearing plate 138.

A flexible bending die 142 for use in cooperation with bending die 105 and exterior frame member 12 is shown in FIGS. 11, 15 and 16, as well as in other figures. Flexible die 142 preferably is defined by an elongate piece of hard rubber or similar material having a generally rectangular cross-sectional configuration. Accordingly, flexible die 142 has a top face 143, a botton face 144 (see FIG. 16), a front face 145, and a rear face 146. The distance between top and bottom faces 143 and 144 of the flexible die is slightly greater than the distance between lower surface 118 of rigid die flange 113 and that surface of mounting flange 22 of exterior frame member 12 which is not engaged with die member flange 114 when the exterior frame member is intimately engaged with die member 105, as shown in FIG. 11. That is, the height of the flexible die member is selected relative to the dimensions of exterior frame member 12 such that, when the exterior frame member is mated to rigid die member 105, the flexible die member must be forced into the position shown in FIG. 11 between the exterior frame member and flange 113 of rigid die 105.

As shown in FIGS. 11 and 15, the front face 145 of the flexible die is configured to mate intimately with substantially all of that portion of the cross-sectional configuration of exterior frame member 12 which is not engaged by rigid die member 105 when the exterior frame member and the rigid die member are mated and frame member 12 has been bent to the desired curvature. That is, the configuration of the flexible die is such that the flexible die deforms to the cross-section of member 12 as bent, rather, than from the initial cross-section of member 12 prior to bending. Accordingly, four elongate grooves 148 are defined parallel to each other within face 145. One of grooves 148 is defined jointly in front face 145 and top face 143 of the flexible die. The width of each of grooves 148 is equal to the width of each of stub flanges 23 of exterior frame member 12, and the depth of each groove 148 is equal to the extent of stub flanges 123 from the adjacent surface of web 18 of the exterior frame member. Similarly, the spacing between adjacent ones of grooves 148 is equal to the spacing between adjacent ones of stub flanges 23. Accordingly, flexible die 142 is readily matable with exterior frame member 12 in the manner illustrated in FIG. 11.

In a preferred bending procedure practiced according to this invention in connection with exterior frame member 12, it is preferred that the exterior frame member be heated over the portion of its length to be bent by heating fluid applied directly to the exterior frame member through flexible die 142. Accordingly, a bore 150 (see FIG. 11) is provided along a portion of the flexible die from one end 149 thereof in spaced relation to the bottoms of grooves 148 and in spaced relation to the exterior faces of the flexible die. At selected intervals along the length of the flexible die member, bore 150 is connected by passages 151 to the bottoms of each of grooves 148 (except that one of the grooves 148 defined conjointly by faces 143 and 145 of the flexible die member). Also, as shown in FIG. 16, a plurality of parallel grooves 152 are formed in bottom face 144 of the flexible die. Grooves 152 do not extend from end to end of the flexible die, but extend over a major portion of the length of the die parallel to front face 145. At selected intervals along their lengths, each of grooves 152 is connected to bore 150 by passages 153. A flexible heating fluid and fluid cooling medium supply duct 154 is connected to bore 150 at end 149 of the flexible die member, as shown in FIG. 15.

FIG. 20 is a largely schematic illustration of a bending system 156, according to this invention. As will be apparent from the following description, system 156 is a simplified system as compared to the system illustrated in FIG. 23. System 156 includes a rigid die 105 as described above, and a flexible die such as die 142 described above. As shown in FIG. 20, it is within the scope of this invention that the separate heating fluid and coolant medium supply ducts 134 and 135 may be combined into a single duct connected to the rigid die; accordingly in FIG. 20, this unification of ducts is shown by duct 134/135 which, together with the flexible ducting from flexible die 142, is connected to a valving manifold assembly 157.

Valving manifold assembly 157 includes a heating fluid header 158 and a coolant medium header 159. A source 160 of heating fluid is connected to header 158 and a source of fluid coolant medium 161 is connected to header 159. It has been found that where the elongate thermoplastic member to be bent according to the procedures described herein has been fabricated of Geon 8700-A rigid polyvinyl chloride, saturated steam may be used to advantage as the heating medium. Accordingly, heating fluid source 160 preferably is a boiler 162 having a burner 163. The upper portion of the boiler chamber is connected via a duct 164 and a pressure regulating and relief valve 165 to heating fluid header 158. Preferably, valve 165 is set at a pressure only sufficiently above atmospheric pressure (say, about 5 psi) to assure flow of steam from the valve to dies 105 and 142. Similarly, where the elongate flexible member being bent is defined by Geon 8700-A rigid polyvinyl chloride, it has been found that compressed air may be used to advantage as a fluid coolant medium. Accordingly, source 161 of coolant medium is an air compressor 166 having its output connected to header 159 via an accumulator 167.

Duct 134/135 for rigid bending die 105 is connected to a duct 168 intermediate its ends which are connected to headers 158 and 159, respectively, via separate solenoid valves 169 and 170, respectively. Similarly, duct 154 for flexible bending die 142 is connected to a duct 171 intermediate its ends which are connected to headers 158 and 159, respectively, via separate solenoid valves 172 and 173, respectively. The solenoid valves 169, 170, 172 and 173 are separately operable under the control of a multi-position switch assembly 174 which is connected between the solenoid valves and a suitable source of electrical power 175.

Figure 12:
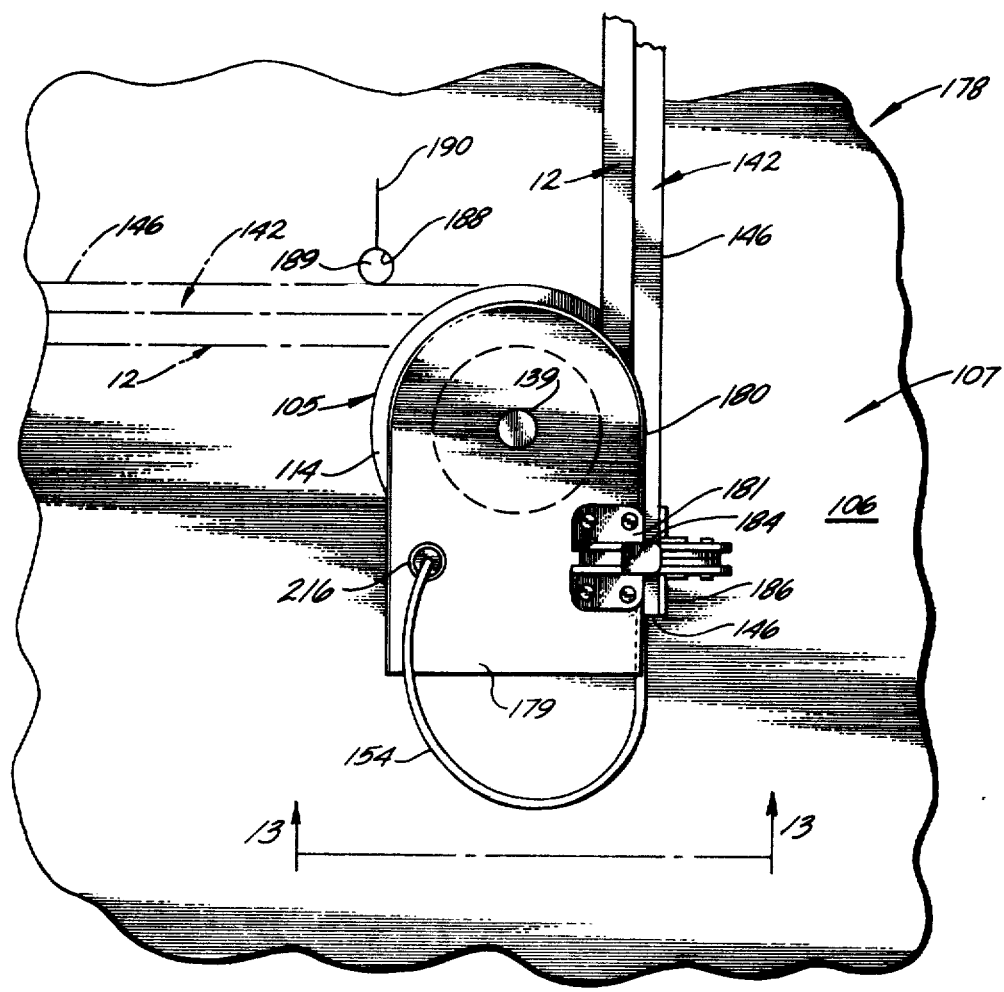
FIG. 12 is a top plan view of another rigid bending die and clamping station according to this invention.
Figure 13:
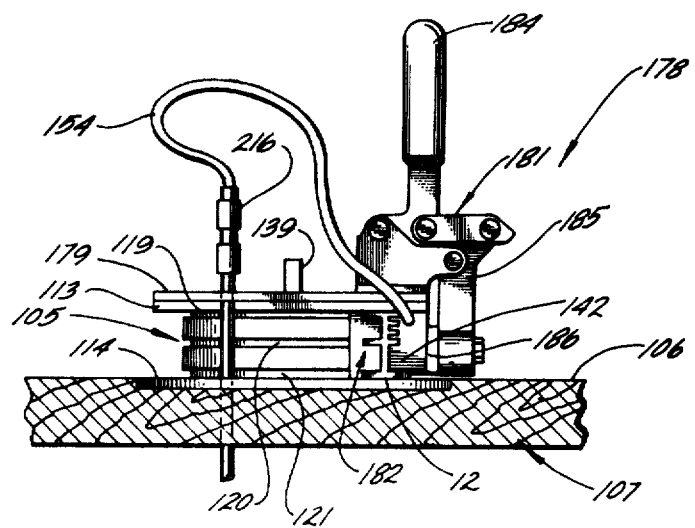
FIG. 13 is an elevation view taken along line 13—13 in FIG. 12.

The content of FIGS. 10 and 11 represents a simplified form of a presently preferred bending arrangment for use in practicing the method of this invention in the process of manufacturing the above-described windows. This simplification of structure has been adopted for FIGS. 10 and 11 so that the basic elements of the rigid and flexible bending dies of this invention may be understood readily. FIGS. 12 and 13 illustrate a presently preferred bending station 178 in which the structure of FIGS. 10 and 11 is incorporated. Accordingly, bending station 178 includes a rigid bending die 105 mounted in the upper surface 106 of a support 107. Bending die 105, illustrated in FIG. 13, is identical to the bending die described above with reference to FIG. 11 except that, in bending station 178, the bearing plate 138 mounted to the upper end of bending die 105 is extended to define a table 179 which has an edge 180 thereof extending generally parallel to a tangent to the curve to which exterior frame member 12 is to be bent; the tangent extends from one end of the arc along which the exterior frame member is to be bent. The table 179 is relied upon to mount a clamp mechanism 181 which is used to securely clamp exterior frame member 12, adjacent the portion thereof to be bent, between flexible bending die member 142 adjacent its end 149 and a backup block 182 (see FIG. 13). Backup block 182 is fixed to support 107 and to the underside of table 179, and provides support for table 179. A face of the backup block is configured to mate with substantially the same portion of the cross-sectional configuration of exterior window frame member 12 as is engaged by rigid bending die 105.

Clamp mechanism 181 preferably is a toggle-action clamping device which includes an operating handle 184 and a pivotable arm 185 connected to the operating handle and to the base of the device by a suitable linkage mechanism. Pivotable arm 185 carries a pressure pad 186 which, when a piece of exterior window frame member 12 is engaged with backup block 182 and flexible die member 142 is in turn engaged with the member to be bent, is movable into and out of secure and forceful clamping relationship with the rear face of the flexible die member adjacent its end 149; this is shown in FIGS. 12 and 13. A suitable form of clamping mechanism 181 is an ADB-60640 vertical angle toggle clamp obtainable from American Drill Bushing Company, 5107 Pacific Boulevard, Los Angeles, California 90058, modified in pivotable arm 185 thereof to carry pressure pad 186.

In the top plan view of FIG. 12, a piece of straight extruded shape material for exterior window frame member 12 is shown in solid lines in its unbent state. Similarly, flexible die 142 is shown in solid lines in FIG. 12. Exterior window frame member 12 and flexible die 142 are shown in the position of the fully bent shape by the phantom line representation of FIG. 12, which illustrates that the shape is to be bent through a 90° angle in bending station 178. A hole 188 is formed in support 107 adjacent die 105 at a position which is immediately adjacent to the rear face 146 of flexible die 142 when the shape has been bent precisely through the arc desired and intimate mating engagement is maintained between the shape and the flexible die. Hole 188 is adapted to receive a pin 189 which bears against the rear face of the flexible die at the completion of the bending process to maintain the bent shape in the desired position while the material from which the shape is cooled is restored to at least a portion of its original rigidity. A mark 190 extends radially from hole 188 on surface 106 of support 107 so that the operator of bending station 178 can be altered to the fact that the bending operation is nearing completion. Preferably the operator follows the rear face of flexible die 142 along mark 190 with pin 189 so that pin 189 is inserted into hole 188 at the instant that the rear face of the flexible die clears hole 188. In this manner, precise control over the exact angle through which shape 12 is bent is achieved.

It is apparent from the foregoing description of bending station 178 that use of the bending station to bend a rigid thermoplastic shape through the desired angle need not make allowances for resilient spring-back of the shape from an overbent state to the properly bent condition. In this regard, the practice of the method of this invention is contrasted with conventional practice for bending steel pipes in which an empirical allowance for resilient spring-back must be taken into consideration.

In the preceding description of FIG. 11, reference was made to a bending handle assembly 140 which is shown in FIG. 14. The bending handle assembly is used to move the shape for exterior window frame member 12, for example, into intimate mating engagement between rigid die 105 and flexible die 142 along an arc of die 105 subtending an angle equal to the angle to which the shape is to be bent. Bending handle assembly 140 is constructed so that this engagement of the shape between dies 105 and 142 is a forceful engagement which is effective to maintain the cross-sectional configuration of the shape throughout the extent of the bend. Bending handle assembly 140 includes an elongate rigid handle bar 193. A head block 194 is secured to one end of bar 193 so that the handle bar and the head block have coplanar bottom surfaces 195 and 196, respectively. These coplanar surfaces bear against bearing plate 138 during use of the bending handle assembly. A hole 197 is formed in head block 194 from bottom surface 196 along a line perpendicular to surface 196. Hole 197 is sized to snugly, yet movably, journal spindle 139 which extends upwardly from bearing plate 138 coaxially of rigid die 105.

A roller axle 198 extends through and is fixed to a slide plate 199 which extends along the underside of bar 193. A roller 200 is rotatably mounted to the lower end of axle 198 by a suitable bearing, such as a ball bearing assembly, 201. Axle 198 extends upwardly from slide plate 199 through a slot 202 formed in and aligned with the length of handle bar 193 adjacent head block 194. The upper end of axle 193 is fixed in a slide block 203 above the handle bar. The rear face of slide block 203, i.e., the face of the slide block opposite from head block 194, is engaged by a compression spring 204. The opposite rear end of the compression spring is engaged against the front face of a stop block 205 which is fixed to the handle bar. The front face of slide block 203 bears against the rear surface of the web 207 of a roller retracting lever 208. The front face of web 207 is urged by spring 204 into engagement with the rear end of head block 194. Retraction lever 208 is pivoted at 209 to handle bar 193 adjacent the rear end of head block 194. Accordingly, by pressing downwardly upon the rear end 210 of retraction lever 208, slide block 203 and roller 200 are moved rearwardly along handle bar 193 away from head block bore 197. Such movement of the roller relative to bore 197 requires movement of slide bar 199 along handle bar 193, and this movement is facilitated by a guide slot 211 formed through the slide bar adjacent its rear end. A guide pin is fixed to handle bar 193 adjacent its rear end and extends through guide slot 211. A knob 213 is rotatably mounted to the rear end of handle bar 193 so that an operator of bending station 178, for example, may conveniently turn handle bar assembly 140 about spindle 139.

The force applied by spring 204 to slide block 203, and thereby to roller 200, is a substantial force on the order of about 9o0 lbs. Referring to FIG. 11, the distance between axis 115 of die 105 and the rear face of flexible die 142, when the flexible die is mated to shape 12 as shown in FIG. 11, is greater than the normal or at-rest distance between the axis of bore 197 to the closet point of roller 200. Accordingly, as shown in FIG. 11, when roller 200 is engaged with the rear face of flexible die 142, slide block 203 is displaced rearwardly along handle bar 193 from head block 194 so that the full force developed by spring 204 is applied to the rear face of flexible die 142 by roller 200. This force is in turn transferred through the flexible die to shape 12 to urge the shape into intimate mating contact with both of dies 105 and 142.

Referring to FIGS. 10, 11, 12, 13 and 20, a presently preferred procedure for bending a piece of extruded stock material of exterior frame member 12 is set forth with reference to the foregoing description of apparatus for performing this process. A piece of extruded shape material for exterior window frame member 12 is engaged with backup block 182 in bending station 178. This engagement involves the mating of flanges 19 and 20 of shape 12 with the corresponding grooves of the backup block and the positioning of the shape relative to the backup block so that the shape is tangent to and is mated with die 105 at one end of the portion of the length of the shape which is to be bent through a 90° angle around rigid die 105. Next, flexible die 142 is engaged with the remaining portion of the cross-sectional configuration of the shape along the shape extending away from backup block 182. Clamping device 181 is then operated to cause pressure pad 186 to move into forceful engagement with the rear face of flexible die 142 opposite backup block 182. This operation of the clamping device causes the shape to be intimately and forcefully mated between the backup block and the flexible die so that the shape is held securely in place and cannot slip relative to stationary die 105.

After the shape for exterior window frame member 12 is clamped between backup block 182 and flexible die 142, bending handle assembly 140 is engaged with spindle 139. To accomplish this, roller retraction lever 208 is depressed to cause roller 200 to move away from the pivot axis of the bending handle assembly sufficiently that, as the bending handle assembly is engaged with spindle 139, roller 200 is moved into position adjacent the back face of flexible die 142 adjacent the point at which the shape is tangent to stationary die 105. The roller retraction lever is then released so that the force developed by spring 204 is applied via roller 200 to the flexible die and to the shape to cause the shape to be intimately engaged between the dies, as shown in FIG. 11.

Since it is desired that, during the bending process, stub flanges 23 and mounting flange 22 of the shape not be allowed to collapse or buckle as they experience tension during bending, it is necessary that the force developed by spring 204 be applied effectively to these features of the shape to provide the necessary antibuckling support. For this reason, it is desired that flexible die 142 be fabricated of a relatively hard elastomeric material; the use of an overly soft elastomer for die 142 results in absorption and improper transmission of the force applied to the die by roller 200 and also results in a flexible die which is difficult to engage with the shape to be bent. Preferably, where the flexible die has the configuration shown in FIG. 11, for example, the flexible die is fabricated of neoprene rubber and has a hardness in the range of 60 to 80 Shore; a hardness of about 80 Shore is preferred. Neoprene rubber is preferred because this rubber is resistant to the heat applied to it during performance of the bending process.

Switch 174 (see FIG. 20) is then operated to open solenoid valves 169 and 172 to supply saturated steam to the rigid and flexible dies. In view of the foregoing description, it will be apparent that this steam is effective to heat the portions of die 105 which are not shielded by liner 125 to about the temperature of saturated steam, i.e., about 212° F. This heat is conducted by the metal of die 105 to those portions of the shape which are engaged with the rigid die. Also, steam is conducted from cavity 110 within die 105 through passages 215 from cavity 110 directly into contact with the shape at web 18 adjacent stub flanges 23. Preferably, a plurality of passages 215 are provided from cavity 110 to die surface 122 around the circumference of the cavity. Accordingly, live saturated steam is directed into contact with the shape along the length thereof from the point at which the shape is intimately mated to the rigid die. Similarly, because conduit 154 for flexible die 142 is connected to duct 171 via a quick-disconnect fitting 216 above table 179 (see FIGS. 12 and 13), it is apparent that opening of solenoid valve 172 also causes live saturated steam to be supplied to the flexible die. This steam is in turn conducted directly into contact with mounting flange 22 and stub flanges 23 of the shape along the length thereof engaged by the flexible die. Thus, opening of solenoid valves 169 and 172 causes the shape of exterior window frame member 12 to be heated along the length thereof sufficiently to cause the material from which the shape is made to soften.

Where the shape is fabricated of Geon 8700-A rigid polyvinyl chloride, the material is heated to a temperature which lies between the deflection temperature of the resin at 264 psi and the compression molding temperature of the resin. The deflection temperature at 264 psi for Geon 8700-A polyvinyl chloride is stated by the manufacturer to be 157° F. The compression molding temperature for rigid polyvinyl chloride polymers and copolymers is in the range of from 285° to 400° F. (see 1970/1971 Modern Plastics Encyclopedia, McGraw-Hill, Inc. at page 786). When Geon 8700-A rigid polyvinyl chloride is heated to a temperature about 212° F., it loses a substantial portion, but not all of its tensile strength and becomes sufficiently pliable that it can be bent, provided that sufficient force is applied to the heated material.

The application of steam to the shape via dies 105 and 142 is continued for about 15 to 30 seconds before the operator begins to turn the bending handle assembly about spindle 139. This initial exposure of the shape to the heating fluid (in this case, steam) is sufficient to condition the shape for bending. It is noted, however, that a longer or shorter conditioning period may be required where a shape of different composition is being bent or the heating fluid is a fluid other than saturated steam.

Bending of the conditioned shape is produced as the bending handle is rotated about spindle 139. This movement of the bending handle, because of the bias applied by spring 204 to the flexible die, causes the shape to move into intimate mating engagement with die 105 progressively around the circumference of the die from its initial point of tangency to the rigid die. The application of heat to the shape is continued as the bending handle is turned about spindle 139. Continued heating of the shape during bending may be achieved by continuing the application of steam to the shape via dies 105 and 142. Alternatively, continued heating of the shape may be achieved by the transfer of stored heat from the thermoconductive rigid die to the shape following closure of valves 169 and 172. Movement of the bending handle around the spindle is continued until the rear face 146 of the flexible die moves into the position shown in dashed lines in FIG. 12. At this instant, the shape will have been bent through an arc of 90°. pin 189 is then placed into hole 188 in die support 107 and the bending handle is left in position adjacent the pin. The engagement of pin 189 and roller 200 with the back face of the flexible die maintains the flexible die in intimate and forceful mated engagement with the bent shape.

After pin 189 has been inserted into its receiving hole, switch 174 is operated to close solenoid valves 169 and 172 (if they have not previously been closed) and to open solenoid valves 170 and 173. By this operation of switch 174, compressed air is supplied to dies 105 and 142. This compressed air flows through passages 151, 153 and 215 and around the bent shape to the atmosphere, and in so doing cools die 105 and extrusion 12. Also, the air evaporates condensed steam which will have collected in the dies and in the passages from the dies to the shape, and this evaporation results in further cooling of the bent shape. The net effect is that after about 20 seconds the shape in the area of the bend and adjacent thereto is cooled sufficiently to restore enough rigidity to the shape that it may safely be removed from the dies without deformation from its bent state. Solenoid valves 170 and 173 are then closed, handle assembly 140 is removed, clamping device 181 is opened, pin 189 is removed from hole 188, and the bent shape is removed from engagement with dies 105 and 142.

From an examination of FIG. 11, for example, it is apparent that as the shape for exterior window frame member 12 is bent to conform to the convex curvature of die 105 around a predetermined extent of the circumference of the die, flanges 19 and 20 of the shape undergo compression and stub flanges 23 and mounting flange 22 experience tension. Because flanges 19 and 20 lie on the side of web 18 which is bent to concave curvature, it is apparent that the effective length of the flanges, along the length of the bend, must be reduced; the neutral axis of the window frame member section substantially coincides with web 18. Accordingly, during the bending process, flanges 19 and 20 increase in depth, i.e., in their distance normal to web 18 to accommodate the effective reduction in their length. It is for this reason that grooves 119, 120 and 121 of die 105 are made deeper than the original depth of flanges 19 and 20. On the other hand, it is apparent that mounting flange 22 and stub flanges 23 experience tension, and these features of shape 12 over the length thereof around the bend are reduced slightly both in thickness and in depth from web 18. Intimate mated engagement of essentially all of the cross-sectional configuration of shape 12 with dies 105 and 142 during the bending operation is desired to prevent buckling or collapse of these features of the shape. Such collapse heretofore has been a common failure in prior attempts to bend and thermoplastic shapes having complex cross-sectional configurations similar to that of frame member 12. The abovementioned hardness of die 142 is relied upon to prevent flanges 22 and 23 from collapsing during bending. Also, since it is the configuration of the shape as bent which is of concern, the flexible die 142 (and similarly with flexible die 220 described below) is arranged to deform during the bending process to the desired final configuration of the shape as bent. Thus, it is contemplated that the flanges of shape 12 may buckle slightly during the initial stages of bending, but the effects of such buckling are removed in the terminal stages of the bending operation by reason of the intimate and forceful mating of the dies to the shape at the conclusion of the bending operation.

It has been found that if the material from which the shape being bent is fabricated is heated to too high a temperature prior to and during the actual bending operation, the material of the shape tends to tear or fracture in those portions experiencing tension. For example, in the case of an extruded shape having the configuration shown in FIG. 11 and fabricated of Geon 8700-A rigid polyvinyl chloride resin, the shape was heated for bending in an oil bath having a temperature of approximately 275° F. When this shape was subjected to bending in the manner described above, it was found that mounting flange 22 tore readily even though the rate of advance of roller 200 around the periphery of die 105 was slow. It is apparent, therefore, that for proper bending of thermoplastic shapes of complex cross-sectional configuration, it is desirable that the thermoplastic material not be heated to too great a temperature prior to and during the bending operation. It is desired that the thermoplastic material be heated to a temperature sufficient to cause the material to experience a reduction in its tensile strength, but that such temperature be insufficient to cause the material to lose all of its tensile strength. Accordingly, the temperature to which the thermoplastic material being bent is heated is a temperature which is below the compression molding temperature for that particular resin. The compression molding temperature for the resin is essentially that temperature at which the resin behaves essentially like a liquid and not like a solid. Also, in view of the foregoing description, it is apparent that some portions of the thermoplastic shape being bent experience compressive stresses during the bending operation. In view of this fact, it is desirable that the thermoplastic material be heated sufficiently that the portions of the shape experiencing compressive stresses be allowed to flow as though the material were being compression molded. In view of these competing effects and the considerations pertinent to them, it is desirable that the temperature of the heating fluid applied to die 105 and, preferably directly to the thermoplastic material via both die 105 and flexible die 142, be at a temperature which is toward the middle or lower portion of the temperature range between the compression molding temperature for the thermoplastic material and the deflection temperature at 264 psi for the thermoplastic material. Where the thermoplastic material is Geon 8700-A rigid polyvinyl chloride, the temperature of saturated steam, i.e., about 212° to 220° F., has been found to be very satisfactory in enabling efficient practice of this invention.

Figure 17:
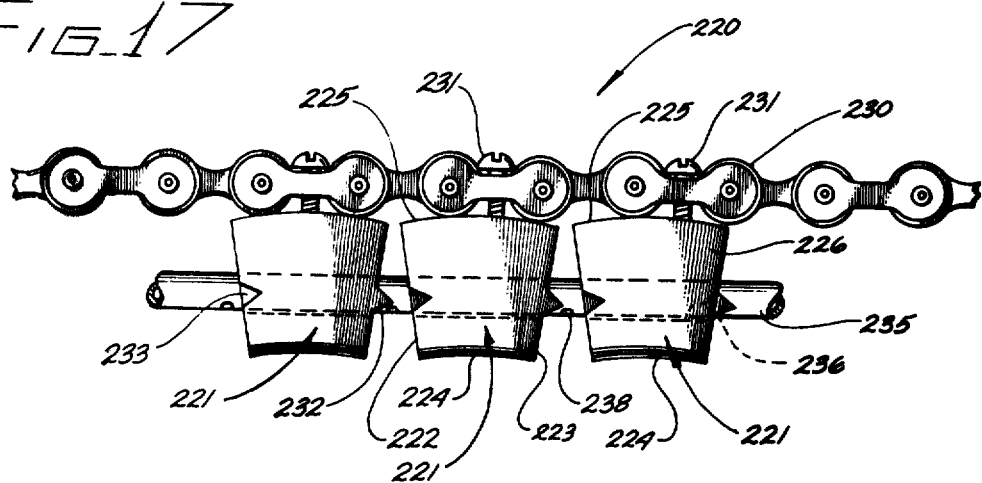
FIG. 17 is a fragmentary top plan view of another flexible bending die according to this invention.
Figure 18:
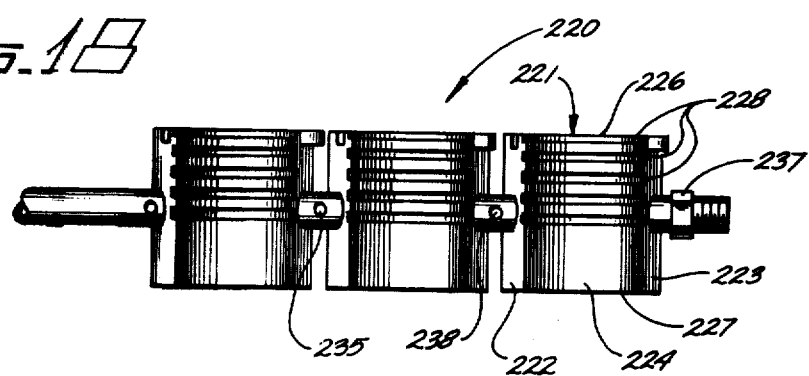
FIG. 18 is an elevation view of one end of the bending die shown in FIG. 17.
Figure 19:
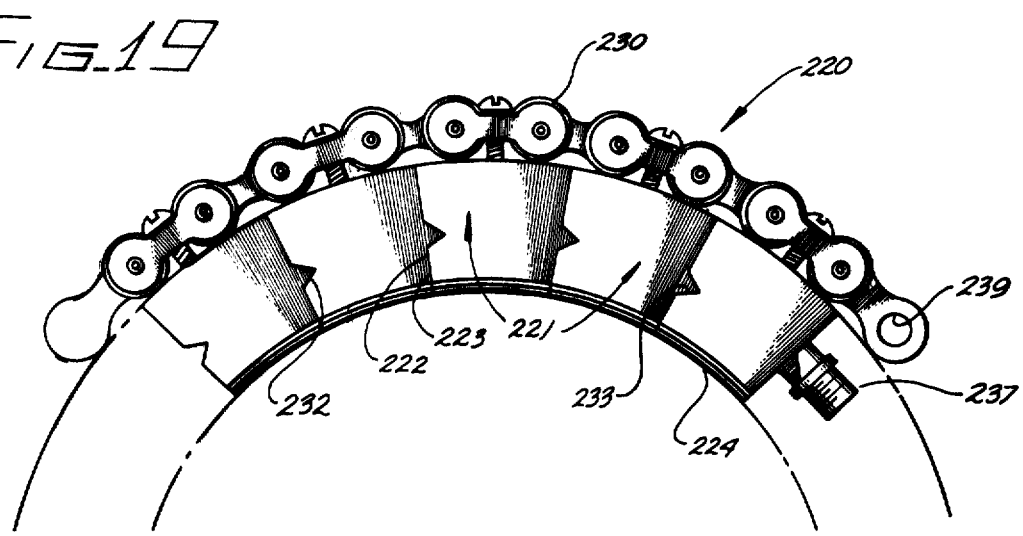
FIG. 19 illustrates a portion of the flexible die of FIG. 17 in its fully closed position.

In the preceding description, reference has been made to a unitary flexible die member 142 fabricated of relatively hard elastomeric material. It was noted above that hardness of the elastomeric material is desired in order that the forces developed by the spring of bending handle assembly 140 may be efficiently transferred to the thermoplastic shape being bent so that the cross-sectional configuration of the shape is maintained as it is bent. FIGS. 17, 18 and 19 illustrate another flexible die means 220 which may be used to advantage in the practice of this invention. Die means 220 is fabricated of a plurality of rigid metallic elements which are movable relative to each other from a state in which they can conform intimately with an unbent thermoplastic shape; the relative movability of the rigid die elements allows them to maintain such intimate engagement with the shape as it is bent to the desired configuration in the manner described above.

Accordingly, flexible die means 220 includes a plurality of essentially identical metal die segments 221 which, when intimately mated to each other in the manner shown in FIG. 19, cooperate to define a segment of a ring which has concave curvature which is a mirror image of the convex curvature assumed by the web of exterior window frame 12, for example, to be bent. Each of die segments 221 has end faces 222 and 223, a die face 224 and a back face 225. Each of die faces 224 has a curvature which corresponds to the curvature of the inner radius of the ring-like assemblage which is formed when the die segments are mated as shown in FIG. 19. End faces 222 and 223 converge toward each other and are arranged so that, when the die segments are arranged in the ring-like manner previously mentioned, they all converge at the center of curvature of the ring. Each die segment also has top and bottom surfaces 226 and 227 which are spaced apart from each other a distance equal to the distance between top and bottom faces 143 and 144 of flexible die 142. Die faces 224 are configured to define a plurality of parallel grooves 228 which are duplicates in width, depth and spacing of the grooves 148 provided in flexible die 142.

Die segments 221 are interconnected by a flexible connection mechanism which, in a preferred form of flexible die means 220, is a length of bicycle chain 230. Each die segment is connected to the chain by a screw 213 passed through an appropriate one of the several links of the chain, and into threaded engagement with the die segment via the rear face 225 thereof. The die segments are spaced appropriately along chain 230 so that, when the chain is flexed or moved, the die segments may be brought into serial engagement with each other with end surface 223 of each segment registered with end surface 222 of the adjacent die segment; this relationship is shown clearly in FIG. 19. To assure proper registry of the die segment end surfaces with each other in the manner shown in FIG. 19, each die segment defines a set of mating projections and recesses. Accordingly, a positionkeying projection 232 extends from each end face 223 adjacent the upper surfaces 226 of each die segment. Also, each die segment defines a mating recess 233 in end surface 222 thereof adjacent the upper surface of the die segment. Accordingly, as the chain is bent to move the die segments into registry with each other, each of projections 232 engages in the adjacent one of recesses 233 so that die segment end surfaces 222 and 223 not only abut each other, but exactly register with each other so that die surfaces 224 form a smoothly curved portion of a right circular cylinder, for example.

To enable application of heating fluid to the flexible die means, and via the flexible die means to a thermoplastic shape undergoing bending, a flexible heating fluid supply tube 235 is threaded through corresponding aligned bores 236 provided through each of the die segments. Bores 236 have a diameter which is greater than the outer diameter of tube 235 so that, as the die segments are moved into and out of mating engagement with each other, tube 235 may slip within bores 236. One end of tube 235 is fixed to the die segment at one end of the series of segments, as shown in FIG. 19. This die segment carries a tubing fitting 237 which adapts tube 235 to be connected to a flexible heating fluid supply conduit 154. The opposite end of tube 235 is disposed exteriorly of the die segment at the opposite end of the series and is closed or sealed by any suitable mechanism. Preferably tube 235 is fabricated of nylon. Tube 235 is perforated as at 238 at spaced locations along tube 235 which correspond to the interfaces between the end surfaces of adjacent die segments. Thus, when heating fluid or fluid cooling medium is supplied to tube 235 and the die segments are not registered with each other but are mated with a thermoplastic shape to be bent, the heating fluid or the fluid cooling medium, as appropriate, is discharged from tube 235 into contact with the shape. A portion of this discharge also heats or cools the adjacent die segments. It is apparent, therefore, that flexible die means 220 may be used to advantage in place of flexible die 142, described above, to practice this invention.

To enable one end of flexible die means 220 to be fixed in position relative to the rigid die in much the same manner that the end of flexible die 142 is held in position by clamp assembly 181, the end of chain 230 adjacent tubing fitting 237 defines an aperture 239. By means of aperture 239, chain 230 may be engaged with a suitable pin fixed to support 107 at the desired location relative to the rigid die with which the flexible die means is configured to cooperate.

In the preceding description of windows 10, 21 and 95, it was observed that the exterior and interior window frame members may be bent in one piece to the desired configuration, if desired. The preceding description of the bending of exterior window frame member 12 has been presented in the context of a single rigid die 105 as a part of the bending apparatus. Obviously, in order that the interior or exterior window frame member may be bent to its ultimate curvature from one piece of extruded frame shape material, a bending apparatus incorporating as many rigid bending dies as there are bends is required. Such a bending apparatus 240 is shown in FIG. 21.

Bending apparatus 240 includes four rigid bending dies 241, 242, 243 and 244 corresponding to the bends of the exterior frame member of window 95 which are associated with corners 97, 98, 99 and 100, respectively. As shown in FIG. 21, rigid dies 241, 242 and 243 are not completely cylindrical, but rather, when viewed end-on, are seen to have a circumference which is only a portion of the circumference of a circle. Since frame member 12 is to be bent at each of these dies through an arc of 90° or less, it is not necessary that the die encompass an arc of 360°.

Dies 241, 242, 243 and 244 are mounted in corresponding recesses 245 formed in the upper surface 246 of a suitable support 247. For reasons which will be apparent from the following description, recesses 245 are elongated to permit movement of the respective dies laterally relative to support 247. Recesses 245 are arranged so that the upper surfaces of the lower die flanges of each of dies 241 through 244 are coplanar with support upper surface 246. Except for the fact that dies 241, 242 and 243 do not have die surfaces extending for an arc of 360° around the axis of the die surface, these dies and die 244 are generally in accord with the foregoing description concerning die 105.

In FIG. 21, broken line 249 represents the line along which the web of exterior window frame member 12 will lie when an appropriate length of extruded shape material has been bent to the desired configuration for window 95, for example.

A clamping station 250 is provided adjacent each of the rigid dies of bending apparatus 240. Each clamping station includes a clamping device 181, according to the foregoing description, which is mounted to the upper portion of a suitable backup block 182 which, in turn, is fixed to the upper surface of support 247. In FIG. 21, only two clamping stations are shown in detail, the locations of the remaining two clamping stations being represented by areas 251.

To provide plural bends in a single length of window frame shape material, a single flexible die having an extendedlength at least equal to the total length of line 249 may be used. Such an extended-length of flexible die member may be of the type represented by flexible die 142 or of the type represented by flexible die means 220. It is preferred, however, that one or two shorter length flexible dies, preferably of the type exemplified by flexible die 142, be used in bending apparatus 240; these flexible dies are used in cooperation with rigid dies 241, 242, 243, and 244 as the several bends of the window frame member are made. it is for this reason, among others, that a clamping station is provided adjacent each of the four dies of bending apparatus 240.

As shown in FIG. 22 which pertains to die 244 but is typical of the mounting arrangements for dies 241, 242 and 243, rigid die 244 is mounted on the upper end of a hollow shaft 255. Shaft 255 extends through an elongate slot 256 formed through support 247. Slot 256 is aligned along the bisector of the included angle associated with the bend to be made in window frame member 12 by use of the corresponding rigid die. Each of recesses 245 is aligned with corresponding slot 256. Shaft 255 extends through slot 256. The lower end of shaft 255 is closed, as by a plug 258, and to which leg 132 of Y fitting 133 is connected. The interior of shaft 255 communicates to the cavity provided within die 244. Accordingly, heating fluid or fluid coolant medium may be supplied to the cavity within die 244 via shaft 255. Shaft 255 is connected to the piston rod 259 of a double-acting pneumatic cylinder assembly 260 which has its cylinder 261 mounted to the underside of support 247. Cylinder assembly 260 is disposed adjacent that end of slot 256 which lies adjacent the center of the area enclosed by line 249 in FIG. 21. The cylinder assemblies are so mounted to the support that piston rods 259 are reciprocable along lines aligned with the lengths of slots 256. When the pneumatic cylinder assemblies are actuated, i.e., in their extended states, the rigid dies are disposed on support 247 in the positions corresponding to the bends of line 249.

Figures 23, 24:
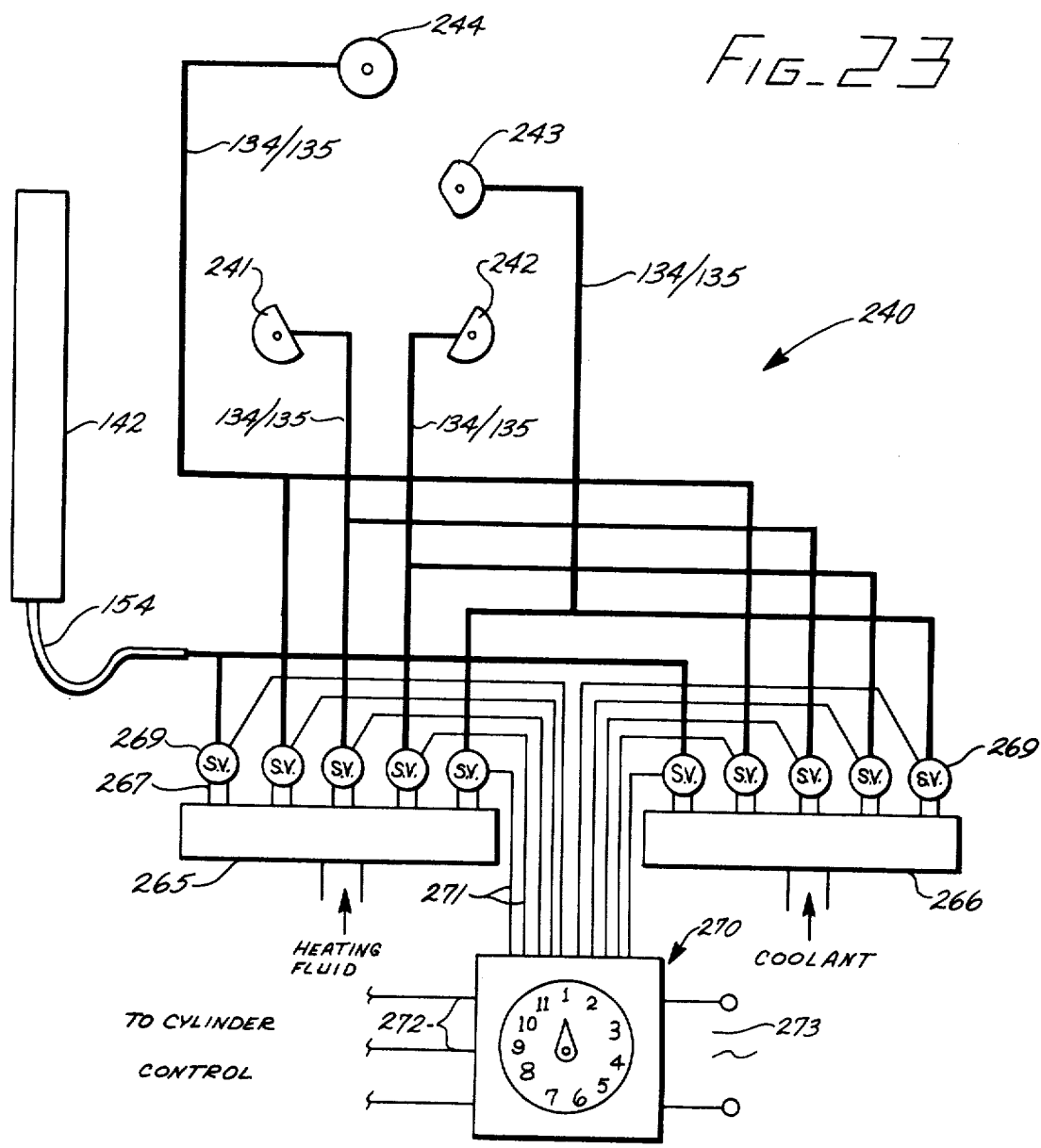
FIG. 23 is a schematic diagram of a multi-die bending apparatus according to this invention.
FIG. 24 is a chart presenting the operational sequence which is presently preferred for the system illustrated in FIG. 23.

The operation of bending apparatus 240 is best explained by reference to FIG. 23 which is a schematic diagram of the electrical and fluid flow ducting systems associated with this bending apparatus. The convention of unified heating fluid and fluid coolant medium flow ducts 134/135 previously used in the description of FIG. 20 is adopted in the illustration of FIG. 23. As shown in FIG. 23, bending apparatus 240 includes a heating fluid header 265 and a fluid coolant medium header 266. Five branch ducts 267 and 268 extend from each of headers 265 and 266, respectively, and each branch duct is fitted with a solenoid valve 269. The operation of solenoid valves 269 is controlled by a multi-position switch assembly 270. In the case of bending apparatus 240, multi-position switch 270 has eleven operative positions. Switch 270 is connected by suitable conductors 271 to the several solenoid valves and also by additional conductors 272 to a suitable solenoid valve pneumatic cylinder control mechanism (not shown). It is believed that the details of a suitable pneumatic cylinder control mechanism are readily apparent to one of ordinary skill in the art to which this invention pertains, and thus such a control mechanism is not illustrated or described in detail. Switch assembly 270 is connected to a suitable source of electric power 273. Each one of unified fluid flow conduits 134/135 for dies 241 through 244 has associated with it one solenoid valve of the heating fluid header arrangement and one solenoid valve of the fluid coolant medium header arrangement. Similarly, duct 154 for flexible die member 142 is coupled to a heating fluid controlling solenoid valve and a fluid coolant medium controlling solenoid valve.

FIG. 24 is a table which describes the operation of bending apparatus 240 in terms of the eleven operative positions of switch assembly 270, when the bending apparatus is used to bend a window frame for window 95, for example. In bending a frame member for window 95, it is presently preferred that the bending operation be carried out on a single piece of extruded window frame shape material cut to the appropriate length, and that the bends be made proceeding along the length of the shape commencing with the bend associated with corner 99 in window 95. Accordingly, in the table of FIG. 24, die 243 is referred to as Die. No. 1, and similarly, dies 244, 241 and 242 are referred to as Dies 2, 3 and 4, since these dies are used for making the second, third and fourth bends, respectively. Also, in the table of FIG. 24, the single flexible die 142 is referred to as a shoe. The notation HF indicates that heating fluid is applied at that stage in the bending process to the appropriate rigid die or to the bending shoe, whereas the symbol C indicates that fluid cooling medium is applied to the appropriate rigid die or to the shoe at that stage in the bending operation.

As indicated in FIG. 24, the first operative position of switch assembly 270 provides an actuate signal via conductors 272 to the control mechanism for double-acting pneumatic cylinders 260. Accordingly, when switch 270 is disposed in its No. 1 position, compressed air is applied to each of cylinder assemblies 260 to cause the pistons thereof to move so as to drive the several rigid dies to the positions shown in FIG. 21. The suitably cut shape material is then engaged with the clamping station associated with the No. 1 die, i.e., rigid die 243. The shape is positioned so that the major portion of the length of the shape extends to the left beyond rigid die 243 from the clamping station and is tangent to the rigid die. A flexible die is also engaged with the clamping station in the manner described above concerning FIG. 11, for example, and the clamping device 181 closed. Bending handle assembly 140 is then engaged with spindle 139 of rigid die 243. Switch assembly 270 is then operated to its No. 2 position which, as shown in the table of FIG. 24, causes heating fluid to be applied to rigid die 243 and to the flexible die at rigid die 243. The bending handle is then turned about spindle 139 of die 243 until a bend of the appropriate curvature and extent has been formed into the shape around die 243. Switch 270 is then operated to its No. 3 position to cause fluid coolant medium to be applied to die 243 and to the flexible die to restore the rigidity to the shape adjacent die 243. Bending handle assembly 240 is then removed from engagement with the pivot spindle of this die.

The flexible die 142 is then moved to the clamping station associated with the No. 2 die, i.e., rigid die 244, and at such station is engaged in intimate forceful mating contact with the extruded stock material which, because of the bend formed therein at die 243, is registered with the backup block adjacent die 244 and with the periphery of rigid die 244; the backup block adjacent die 244 serves as a stop for the bending operation performed at die 243, thereby assuring that the shape is bent at die 243 only through the arc desired. (If desired, a second flexible die may be used to make the bend at rigid die 244, the flexible die at rigid die 243 being left in place until the bend at die 244 is completed and then being moved for use with rigid die 241.) Where only a single flexible die is used, it is noted that during this repositioning of the flexible die from rigid die 243 to rigid die 244, compressed air is applied to the flexible die via flexible conduit 154, but this fact does not hinder relocation of the flexible die within bending apparatus 240. After the flexible die has been engaged to the shape at and adjacent rigid die 244 and securely clamped in the clamping station at that location, the bending handle assembly is engaged with spindle 139 for rigid die 244. Switch 270 is then operated to its No. 4 position. Operation of the switch to its No. 4 position is effective to cause continued application of compressed air to the bent shape at die 243, but to cause heating fluid to be applied to dies 244 and 142. While the switch is in its No. 4 position, the appropriate bend is produced in the shape at rigid die 244. before the bending handle assembly is removed from die 244, switch 270 is operated to its No. 5 position to cause compressed air to be applied to dies 243, 244 and 142. The bending handle assembly is then removed from die 244 and the flexible die is removed from its engagement with the clamping station associated with such die.

Then, as is apparent from the tabular presentation of FIG. 24, the same processes as those already described are carried out in sequence at rigid dies 241 and 242 to produce the third and fourth bends of the desired window frame member. This operation involves progressive disposition of switch assembly 270 in positions Nos. 6–10. After all four bends have been made in the shape, switch assembly 270 is placed in its No. 11 position which is the deactuate position for pneumatic cylinder assemblies 260. In the No. 11 position of the switch, piston rods 259 are retracted to cause the several rigid dies of bending apparatus 240 to move away from the bent shape toward the center of the area bounded by line 249 in FIG. 21. The several dies are moved toward each other an amount sufficient to completely clear the bent shape from the several rigid dies so that the shape may be lifted out of bending apparatus 240. The bent window frame member is then cut into two pieces, preferably at a location between the bends made at dies 244 and 241, to facilitate assembly of the window by the procedures described above. On the other hand, the retractability of rigid dies 241 through 244 may be omitted and the bent window frame member may be cut into two pieces while it is still engaged with the rigid dies at the completion of the bending process. It is apparent that where the rigid dies are not retractable, as described above, the bent shape cannot be removed from the bending apparatus unless it is cut into two pieces.

In the preceding description, the bending of rigid thermoplastic members of complex cross-sectional configuration, in a manner preserving such cross-sectional configuration, has been described with reference to certain procedures and apparatus which are presently preferred for use in manufacturing the windows illustrated in FIGS. 1–9, for example. It will be appreciated that these procedures and apparatus may be used to advantage to produce articles other than the frame members of the above-described windows. Therefore, it should be understood that reference to window frame member 12 and to the particular material from which this presently preferred extrusion is fabricated has been made merely for the purposes of example and illustration. Thus, those skilled in the art to which this invention pertains will appreciate that the procedures and apparatus described concerning FIGS. 10–24 may be used with thermoplastic members of complex cross-section which need not be formed by extrusion techniques and which may be fabricated of materials other than the particular rigid polyvinyl chloride referred to above. Also, workers skilled in the art to which this invention pertains will readily appreciate that the particular procedures and structures described above may be modified or altered to suit specific other members to be bent, and materials of composition thereof, without departing from the scope of this invention.

What is claimed is:

1. Apparatus for bending to a desired curve a shape fabricated of substantially rigid thermoplastic material, the apparatus comprising
    a. a rigid die member defining a first die surface configured to mate intimately with a portion of the cross-sectional configuration of the shape prior to and during bending of the shape, and to define the desired curve to which the shape is to be bent,
    b. a flexible die configured in cooperation with the rigid die member for mating intimately, along a substantial portion of the length of the shape to be bent which corresponds in extent to an increment of the length of the shape which is continuously curved after bending of the shape, with substantially the remainder of the cross-sectional configuration of the shape prior to and throughout bending of such portion of the length of the shape as bent,
    c. heating means including means cooperable with the rigid die member for heating the rigid die member and, via at least the rigid die member, a shape mated to the rigid die member sufficiently to soften the shape to a plastic state in which the shape material retains a portion of its original tensile strength, and
    d. means cooperable with the die member and the flexible die for forceably mating and confining a shape between the rigid die member and the flexible die over a length of the die surface defining the desired curve.

2. Apparatus according to claim 1 wherein the shape defines a web and is to be bent to the desired curve in a plane substantially normal to the web, and the shape includes a plurality of spaced first flanges extending substantially normally from the side of the web to be bent to concave curvature and a second flange extending substantially normally from the other side of the web, wherein the first die surface is convexly curved and defines a plurality of parallel grooves therein extending therealong for receiving and mating intimately with respective ones of the first flanges, the grooves being of sufficient depth to fully receive said first flanges for mating of the first die surface with the shape web between the first flanges.

3. Apparatus according to claim 2 wherein the portions of the rigid die defining the convex die surface and the grooves are fabricated of metal, and the heating means includes a chamber defined within the rigid die communicating to said metal, and means for supplying a heating fluid and a cooling medium to the chamber for heating and cooling, respectively, said metal portions of the rigid die.

4. Apparatus according to claim 2 wherein the first die surface grooves each have a depth from the convex die surface a selected amount greater than the extent of the respective first flange normally from the shape web.

5. Apparatus according to claim 2 wherein the rigid die defines a pair of spaced die surfaces extending outwardly beyond the convex die surface adjacent the opposite edges of the convex die surface along the extent of the arc of the convex die surface for guiding a shape to be bent into intimate mating engagement with the convex die surface and for cooperation with the flexible die for guiding the flexible die into intimate mating engagement with a shape engaged with the rigid die member.

6. Apparatus according to claim 3 including passage means communicating from the chamber to the convex die surface.

7. Apparatus according to claim 6 wherein the heating fluid is saturated steam.

8. Apparatus according to claim 6 wherein the cooling medium is air.

9. Apparatus according to claim 2 wherein the desired curve is a portion of the arc of a circle and the convex die surface is a portion of a right circular cylinder which subtends an included angle greater than the included angle subtended by the desired curve.

10. Apparatus according to claim 1 including a support member for the rigid die member, the support member having a work surface to which the rigid die member is mounted.

11. Apparatus according to claim 10 including means coupled to the rigid die member operable for moving the rigid die member relative to the support member along a line substantially parallel to the support member work surface toward and away from a predetermined position of the rigid die member.

12. Apparatus according to claim 1 wherein the flexible die is arranged to mate intimately with a shape to be bent over at least the length thereof to be bent when the shape is in an unbent state and to maintain said intimate mating with the element along such length during bending of the shape to the desired curve.

13. Apparatus according to claim 12 wherein the heating means includes means connectible to the flexible die for heating and cooling a shape engaged by the flexible die via the flexible die.

14. Apparatus according to claim 12 wherein the flexible die includes means connectible to a source of heating fluid and operable for applying a heating fluid directly to a shape engaged by the flexible die from the flexible die.

15. Apparatus according to claim 14 wherein heating fluid applying means comprises fluid passage means in the flexible die communicating to a shape engaged by the flexible die.

16. Apparatus according to claim 15 wherein the heating fluid is saturated steam.

17. Apparatus according to claim 15 wherein the flexible die includes means connectible to a source of a cooling medium and operable for applying a fluid cooling medium directly to a shape engaged by the flexible die via said fluid passage means.

18. Apparatus according to claim 14 wherein the flexible die is defined principally by an elongate bar of elastomeric material.

19. Apparatus according to claim 18 wherein the elastomeric material has a hardness equivalent to a hardness in the range of from about 60 Shore to about 80 Shore.

20. Apparatus according to claim 19 wherein the hardness of the elastomeric material is equivalent to about 80 Shore.

21. Apparatus according to claim 19 wherein the elastomeric material includes a substantial portion of neoprene rubber.

22. Apparatus according to claim 14 wherein the flexible die comprises a plurality of rigid members each configured to mate intimately with substantially the remainder of the cross-sectional configuration of a shape to be bent, and means interconnecting the rigid members in a serial arrangement for movement of the rigid members between a relation corresponding to an unbent state of the shape and a relation corresponding to the state of the shape when bent to the desired curve.

23. Apparatus according to claim 22 wherein the means for applying a heating fluid includes a flexible heating fluid discharge tube extending through and loosely journalled within the several rigid members, and openings from the tube at spaced locations along the tube corresponding to positions between adjacent ones of the rigid members.

24. Apparatus according to claim 22 including means cooperating between adjacent ones of the rigid members for aligning the rigid members in a predetermined manner when the rigid members are moved into the relation thereof corresponding to the bent state of said shape.

25. Apparatus according to claim 1 wherein the portion of the rigid die member defining the first die surface is fabricated of metal, and the heating means includes a chamber defined within the rigid die member at least a portion of which is bounded by said metal, and means for supplying to the chamber a heating fluid.

26. Apparatus according to claim 25 including passage means defined through said metal from the chamber to selected locations of the first die surface.

27. Apparatus for bending to a desired curve a shape fabricated of substantially rigid thermoplastic material, the apparatus comprising
   a. a rigid die member defining a first die surface configured to mate intimately with a portion of the cross-sectional configuration of the shape prior to and during bending of the shape, and to define the desired curve to which the shape is to be bent,
   b. a flexible die defined principally by an elongate bar of elastomeric material and configured in cooperation with the rigid die member to mate intimately with substantially the remainder of the cross-sectional configuration of the shape as bent, the bar being arranged to mate intimately with at least the length of the shape to be bent when the shape is in an unbent state and to maintain said intimate mating with the element along such length during bending of the shape to the desired curve,
   c. heating means including means cooperable with the rigid die member for heating the rigid die member and, via at least the rigid die member, a shape mated to the rigid die member sufficiently to soften the shape to a plastic state in which the shape material retains a portion of its original tensile strength, the heating means including means for applying a heating fluid directly to a shape engaged by the flexible die from the flexible die, and
   d. means cooperable with the rigid die member and the flexible die for forceably mating and confining a shape between the rigid die member and the flexible die over a length of the die surface defining the desired curve.

28. Apparatus according to claim 27 wherein the elastomeric material has a hardness equivalent to a hardness in the range of from about 60 Shore to about 80 Shore.

29. Apparatus according to claim 28 wherein the hardness of the elastomeric material is equivalent to about 80 Shore.

30. Apparatus according to claim 28 wherein the elastomeric material includes a substantial portion of neoprene rubber.

31. Apparatus for bending to a desired curve a shape fabricated of substantially rigid thermoplastic material, the apparatus comprising
   a. a rigid die member defining a first die surface configured to mate intimately with a portion of the cross-sectional configuration of the shape prior to and during bending of the shape, and to define the desired curve to which the shape is to be bent,
   b. a flexible die configured in cooperation with the rigid die member to mate intimately with substantially the remainder of the cross-sectional configuration of the shape as bent, the flexible die being arranged to mate intimately with at least the length of the shape to be bent when the shape is in an unbent state and to maintain said intimate mating with the element along such length during bending of the shape to the desired curve, the flexible die comprising a plurality of rigid members each configured to mate intimately with substantially the remainder of the crosssectional configuration of a shape to be bent, and means interconnecting the rigid members in a serial arrangement for movement of the rigid members between a relation corresponding to an unbent state of the shape and a relation corresponding to the state of the shape when bent to the desired curve,
   c. means connectible to the rigid die member for heating the rigid die member and, via at least the rigid die member, a shape mated to the rigid die member sufficiently to soften the shape to a plastic state in which the shape material retains a portion of its original tensile strength, the heating means including means connectible to a source of heating fluid carried by the flexible die and operable for applying a heating fluid directly to a shape engaged by the flexible die from the flexible die, and
   d. means cooperable with the flexible die for forceably mating and confining a shape between the rigid die member and the flexible die over a length of the die surface defining the desired curve.

32. Apparatus according to claim 31 wherein the means for applying the heating fluid includes a flexible heating fluid discharge tube extending through and loosely journalled within the several rigid members, and openings from the tube at spaced locations along the tube corresponding to positions between adjacent ones of the rigid members.

33. Apparatus according to claim 31 including means cooperating between adjacent ones of the rigid members for aligning the rigid members in a predetermined manner when the rigid members are moved into the relation thereof corresponding to the bent state of said shape.

* * * * *

UNITED STATES PATENT AND TRADEMARK OFFICE
CERTIFICATE OF CORRECTION

PATENT NO. : 3,977,819
DATED : August 31, 1976
INVENTOR(S) : John I. Gates

It is certified that error appears in the above-identified patent and that said Letters Patent are hereby corrected as shown below:

Column 2, line 32, "inpipe" should read -- in pipe --; line 46, "developement" should read -- development --; line 55, "thermoplasitc" should read -- thermoplastic --; line 64, "aa" should read -- a --. Column 3, line 9, "defined" should read -- defines --. Column 10, line 32, "altered" should read -- alerted --. Column 11, line 40, "9o0" should read -- 90 --; line 45, for "closet" read -- closest --. Column 12, line 4, "foreceful" should read -- forceful --. Column 16, line 14, "213" should read -- 231 --; line 27, "positionkeying" should read -- position-keying --. Column 17, line 63, "extendedlength" should read -- extended-length -- Column 24, line 29, "crosssectional" should read -- cross-sectional --.

Signed and Sealed this

Eighth Day of February 1977

[SEAL]

Attest:

RUTH C. MASON
Attesting Officer

C. MARSHALL DANN
Commissioner of Patents and Trademarks